United States Patent [19]

Gilhousen et al.

[11] Patent Number: 4,613,901
[45] Date of Patent: Sep. 23, 1986

[54] SIGNAL ENCRYPTION AND DISTRIBUTION SYSTEM FOR CONTROLLING SCRAMBLING AND SELECTIVE REMOTE DESCRAMBLING OF TELEVISION SIGNALS

[75] Inventors: Klein S. Gilhousen, San Diego; Charles F. Newby, Jr., El Cajon; Karl E. Moerder, Poway, all of Calif.

[73] Assignee: M/A-COM Linkabit, Inc., San Diego, Calif.

[21] Appl. No.: 498,800

[22] Filed: May 27, 1983

[51] Int. Cl.⁴ .................. H04N 7/167; H04L 9/00
[52] U.S. Cl. ........................ 358/122; 178/22.07; 178/22.1; 178/22.16
[58] Field of Search .............. 358/122; 178/22.07, 178/22.1, 22.14, 22.16

[56] References Cited

U.S. PATENT DOCUMENTS

| | | | |
|---|---|---|---|
| 3,238,297 | 3/1966 | Pawley et al. | 178/22 |
| 3,668,307 | 6/1972 | Face et al. | 178/5.6 |
| 3,729,581 | 4/1973 | Anderson | 178/6.8 |
| 3,777,053 | 12/1973 | Wittig et al. | 178/5.1 |
| 3,798,359 | 3/1974 | Feistel | 178/22 |
| 3,803,491 | 4/1974 | Osborn | 325/53 |
| 3,886,302 | 5/1975 | Kosco | 178/5.1 |
| 3,894,176 | 7/1975 | Mellon | 178/5.1 |
| 3,899,633 | 8/1975 | Sorenson et al. | 178/5.1 |
| 3,916,091 | 10/1975 | Kirk, Jr. et al. | 178/5.1 |
| 3,919,462 | 11/1975 | Hartung et al. | 178/5.1 |
| 3,936,593 | 2/1976 | Aaronson et al. | 178/5.1 |
| 3,997,718 | 12/1976 | Ricketts et al. | 178/6.8 |
| 4,024,574 | 5/1977 | Nieson | 358/117 |
| 4,025,948 | 5/1977 | Loshin | 358/122 |
| 4,058,830 | 11/1977 | Guinet et al. | 358/86 |
| 4,068,264 | 1/1978 | Pires | 358/122 |
| 4,091,417 | 5/1978 | Nieson | 357/117 |
| 4,112,464 | 9/1978 | Guif et al. | 358/122 |
| 4,115,662 | 9/1978 | Guinet et al. | 179/15 BV |
| 4,115,807 | 9/1978 | Pires | 358/122 |
| 4,160,120 | 7/1979 | Barnes et al. | 178/22 |
| 4,161,751 | 7/1979 | Ost | 358/114 |
| 4,163,254 | 7/1979 | Block et al. | 358/122 |
| 4,163,255 | 7/1979 | Pires | 358/122 |
| 4,172,213 | 10/1979 | Barnes et al. | 178/22 |
| 4,215,366 | 7/1980 | Davidson | 358/124 |
| 4,225,884 | 9/1980 | Block et al. | 358/122 |
| 4,250,524 | 2/1981 | Tomizawa | 358/122 |
| 4,253,114 | 2/1981 | Tang et al. | 358/114 |
| 4,292,650 | 9/1981 | Hendrickson | 358/123 |
| 4,302,771 | 11/1981 | Gargini | 358/86 |
| 4,304,990 | 12/1981 | Atalla | 235/379 |
| 4,316,055 | 2/1982 | Feistal | 178/22.06 |
| 4,322,745 | 3/1982 | Saeki et al. | 358/123 |
| 4,323,921 | 4/1982 | Guillou | 358/114 |
| 4,323,922 | 4/1982 | den Toonder et al. | 358/117 |
| 4,331,973 | 5/1982 | Eskin et al. | 358/84 |
| 4,331,974 | 5/1982 | Cogswell et al. | 358/86 |
| 4,336,553 | 6/1982 | den Toonder et al. | 358/120 |
| 4,338,628 | 7/1982 | Payne et al. | 358/120 |
| 4,354,201 | 10/1982 | Sechet et al. | 358/122 |
| 4,388,643 | 6/1983 | Aminetzah | 358/122 |
| 4,458,109 | 7/1984 | Mueller-Schloer | 178/22.16 |
| 4,461,032 | 7/1984 | Skerlos | 455/4 |
| 4,467,139 | 8/1984 | Mollier | 178/22.08 |
| 4,471,164 | 9/1984 | Henry | 178/22.11 |
| 4,484,027 | 11/1984 | Lee et al. | 358/122 |
| 4,531,011 | 7/1985 | Bluestein et al. | 178/22.08 |
| 4,531,020 | 7/1985 | Wechselberger et al. | 178/22.08 |
| 4,533,948 | 8/1985 | McNamara et al. | 358/122 |
| 4,533,949 | 8/1985 | Fujimura et al. | 358/122 |
| 4,535,355 | 8/1985 | Arn et al. | 358/122 |

Primary Examiner—Stephen C. Buczinski
Assistant Examiner—Linda J. Wallace
Attorney, Agent, or Firm—Edward W. Callan

[57] ABSTRACT

A system and method for scrambling and selectively descrambling television signals that are transmitted to subscribers' descramblers in a subscription television system. A working key signal is generated by processing an "initialization vector" signal in accordance with the DES algorithm upon the algorithm being keyed by either a common category key signal or some other key signal. A unique encryption keystream is generated by processing the initialization vector signal in accordance with the DES algorithm upon the algorithm being keyed by the working key signal. A television signal is scrambled in accordance with the unique encryption keystream to provide a scrambled television signal. A plurality of unique encrypted category key signals individually addressed to different selected subscribers' descramblers are generated by processing the initial common category key signal in accordance with the DES algorithm upon the algorithm being keyed by a plurality of different "unit key" signals unique to different selected descramblers. The scrambled television signal, the initialization vector signal, and the plurality of encrypted category key signals are broadcast to the descramblers. A corresponding tier of DES algorithms are employed at the descrambler to reproduce the encryption keystream; and the TV signal is descrambled in accordance therewith. Each descrambler has its unique unit key signal stored in a secure memory for use in reproducing the common category key signal when the descrambler is addressed by its unique encrypted category key signal.

26 Claims, 8 Drawing Figures

SIGNAL ENCRYPTION AND DISTRIBUTION SYSTEM FOR CONTROLLING SCRAMBLING AND SELECTIVE REMOTE DESCRAMBLING OF TELEVISION SIGNALS

BACKGROUND OF THE INVENTION

The present invention generally pertains to subscription television systems and is particularly directed to a system for controlling scrambling and selective, remote descrambling of television signals.

There are many schemes for controlling scrambling and selective, remote descrambling of television signals available for use in subscription television systems, including schemes wherein only selected subscribers' descramblers are addressed to be enabled to descramble scrambled television signals. These schemes heretofore have not provided the degree of security against unauthorized descrambling that is desired by the subscription television industry.

SUMMARY OF THE INVENTION

The present invention is characterized by a key signal encryption and distribution system for scrambling and selective, remote descrambling of television signals.

The present invention utilizes advanced cryptographic techniques to provide a video scrambling and selective descrambling system that is highly secure against unauthorized descrambling.

Such security is based in part upon the use of an encryption algorithm, such as the DES (Data Encryption Standard) algorithm. The DES algorithm is keyed by a 56-bit key signal. Without knowing the content of the key signal, a DES encrypted message cannot be decrypted unless all 72,057,590,000,000,000 possible key signals are tested by trial and error. Such a task would require an incredibly expensive and powerful computer. Since there is no such thing as an "unbreakable" deterministic cipher generator, the best one can hope for is to make the cryptanalysis process vastly more expensive than the value of the information that one is trying to protect. The DES algorithm succeeds in this endeavor quite nicely for subscription TV systems. The DES algorithm is the one commercially available cryptographic algorithm that has been most thoroughly analyzed and tested under attack and which is now believed to provide an extremely high level of security. At least three levels of encryption algorithms are used in scrambling and descrambling the television signal in the system of the present invention.

The following functions are performed in the system of the present invention.

A subsystem in each descrambler provides a subscriber key signal that is unique to the descrambler.

A control computer stores a list of the unique subscriber key signals for the descramblers of the system. The control computer also stores a list defining a hierarchy of common category key signals corresponding to a hierarchy of address groups defined on the basis of subscribers having a common grade of service or other attributes that makes it desirable to address a group of subscribers' descramblers in common.

The control computer generates from the stored hierarchy list, a common category key signal corresponding to a selected address group in the hierarchy of address groups. The computer further generates from the stored subscriber key signal list, a group of unique subscriber key signals corresponding to the selected address group.

The scrambler generates a group of unique encrypted category key signals individually addressed to different selected subscribers' descramblers by processing the generated common category key signal in accordance with a first encryption algorithm upon the first algorithm being keyed by the generated group of unique subscriber key signals; generates a working key signal by processing an initialization vector signal in accordance with a second encryption algorithm upon the second algorithm being keyed by either the generated common category key signal or some other key signal; generates a unique keystream by processing the initialization vector signal in accordance with a third encryption algorithm upon the third algorithm being keyed by the working key signal; and scrambles a television signal in accordance with the unique keystream to provide a scrambled television signal.

Preferably, a new working key signal is generated every few TV frames. The initialization vector signal is a signal derived from real time that is communicated to the descrambler as a synchronization control signal. Preferably it provides a time-based repetitive sequentially varying count of TV frames.

The category membership of a subscriber defines the grade of service that a subscriber receives. Preferably the category key signal is varied from time to time, such as weekly, or whenever the subscriber's grade of service is changed.

Preferably the control computer stores a list defining a plurality of channel key signals respectively corresponding to different time blocks for different television channels in the system, and generates a selected channel key signal from said channel key signal list; and the scrambler generates an encrypted channel key signal by processing the selected channel key signal in accordance with a fourth encryption algorithm upon the fourth algorithm being keyed by the generated common category key signal; and generates the working key signal by processing the initialization vector signal in accordance with the second encryption algorithm upon the second algorithm being keyed by the selected channel key signal.

The scrambled television signal, the initialization vector signal, and the group of unique encrypted category key signals are communicated to the subscribers' descramblers.

Each descrambler reproduces the common category key signal, when the descrambler receives the unique encrypted category key signal addressed thereto, by processing the encrypted category key signal addressed to the descrambler in accordance with the first algorithm upon the first algorithm being keyed by the unique subscriber key signal provided in the addressed descrambler; reproduces the working key signal, when the common category key signal is reproduced in the descrambler, by processing the initialization vector signal in accordance with the second algorithm upon the second algorithm being keyed by either the common category key signal that is reproduced in the descrambler in relation to the reproduced common category key signal (such as the selected channel key signal), consistent with which key signal was used to key the second algorithm in the scrambler; reproduces the unique keystream, when the working key signal is reproduced in the descrambler, by processing the initialization vector signal in accordance with the third algorithm upon the third algorithm being keyed by the working key signal that is reproduced in the descrambler; and descrambles the scrambled television signal, when the unique keystream is reproduced in the descrambler, by descrambling the scrambled television signal in accordance with the unique keystream that is reproduced in the descrambler.

A given descrambler cannot decrypt an encrypted category signal unless the unique subscriber key signal for the given descrambler was used to encrypt the common category signal.

Each descrambler includes a secure memory for storing information that is used for providing the unique subscriber key signal in the descrambler. The secure memory makes the system of the present invention additionally secure. Even if a cryptanalyst were equipped with an operable descrambler, a complete set of drawings, and advanced cryptographic equipment he would not be able to descramble the television signal unless the descrambler memory contained information essential to providing a key signal identical to one of the unique subscriber key signals used in encrypting the category key signal. Only unique subscriber key signals of authorized subscribers are used in encrypting the category key signal. The information for providing the unique subscriber key signal is stored in a secure internal read only memory (ROM) of a microprocessor chip having internal architecture that prohibits the ROM from being read off-chip. Since the ROM can only be read by the microprocessor, a high level of security against disclosing the unit key signal to signal processing methods of analysis is assured.

In the preferred embodiment, a subscriber key generation number that is common to all of the subscribers' descramblers corresponding to selected address group is generated by the control computer and communicated to the subscribers' descramblers together with the group of unique encrypted category key signals. In such embodiment the subscriber key subsystem in each descrambler combines the communicated subscriber key generation number with a unique subscriber address signal stored in the secure memory of the descrambler to provide a unique subscriber key generation signal. The subsystem provides the unique subscriber key signal by processing the subscriber key generation signal in accordance with an encryption algorithm upon the algorithm being keyed by a subscriber key seed signal that is unique to the descrambler. The subscriber key seed signal preferably is stored in the secure memory of the descrambler and is retrieved therefrom to key the encryption algorithm in response to a predetermined seed address included in a given position in the subscriber key generation number.

Although the present invention is described herein as being applicable to a subscription television system, it also is broadly applicable to other types of communications systems.

Additional features of the present invention are described in relation to the description of the preferred embodiment.

DESCRIPTION OF THE PREFERRED EMBODIMENT

Figure 1:
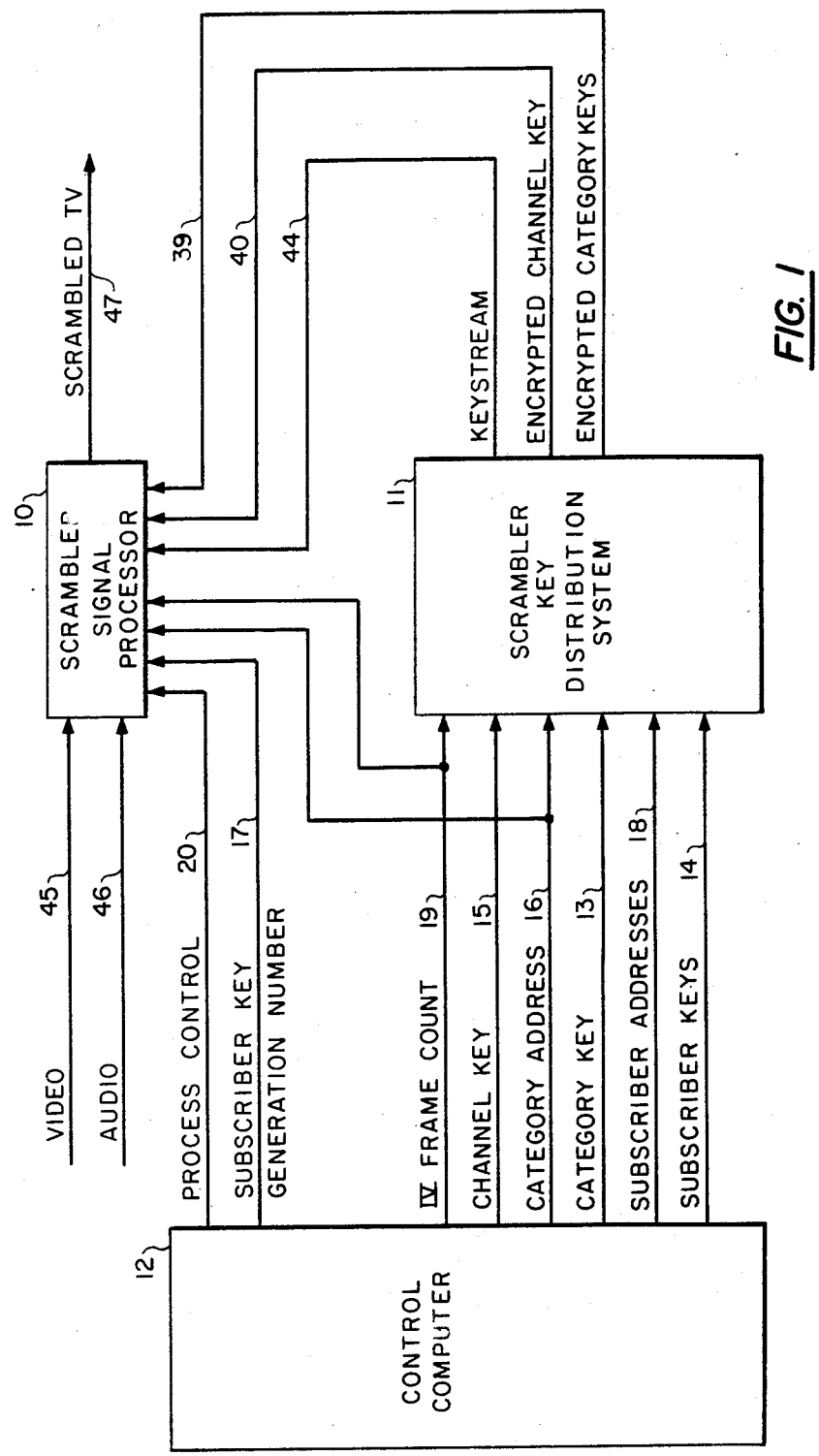
FIG. 1 is a block diagram of a scrambling system according to the present invention.

Referring to FIG. 1, a preferred embodiment of a scrambling system according to the present invention includes a scrambler signal processor 10, a scrambler key distribution system 11 and a control computer 12.

The control computer 10 stores a list of subscriber key signals that are unique to the different descramblers of the subscription television system.

The control computer 12 also stores a list defining a hierarchy of address groups defined on the basis of subscribers having a common grade of service or other attributes that makes it desirable to address a group of subscribers' descramblers in common. From the stored hierarchy list, the control computer 12 generates a 56-bit common category key signal on line 13 corresponding to a selected address group in the hierarchy of address groups.

From the stored subscriber key signal list, the control computer 12 generates a group of unique 56-bit subscriber key signals on line 14 corresponding to the selected address group.

The control computer 12 further stores a list defining a plurality of channel key signals respectively corresponding to different time blocks for different television channels, and generates a selected 56-bit channel key signal from the channel key signal list onto line 15. Together with the channel key signal on line 15, the control computer 12 generates a selected 16-bit category address signal on line 16 corresponding to the selected address group.

The control computer 12 generates a 32-bit subscriber key generation number on line 17 that is common to all of the subscribers' descramblers.

The control computer additionally stores a list of 32-bit subscriber address signals that are unique to the different descramblers of the subscription television system, and generates a group of unique 32-bit subscriber address signals corresponding to the selected address group from the unit address signal list. The unique subscriber address signals on line 18 are generated on line 18 by the control computer 12 together with the respective unique subscriber key signals generated by the control computer on line 14.

In addition, the control computer 12 generates a 24-bit initialization vector (IV) frame count signal on line 19 and process control signals on lines 20. The IV signal on line 19 is a time-based signal indicating a repetitive sequentially varying count. In an alternative preferred embodiment (not shown) the IV frame count signal is produced in the scrambler signal processor 10 and provided therefrom to the scrambler key distribution system 11.

Figure 5:
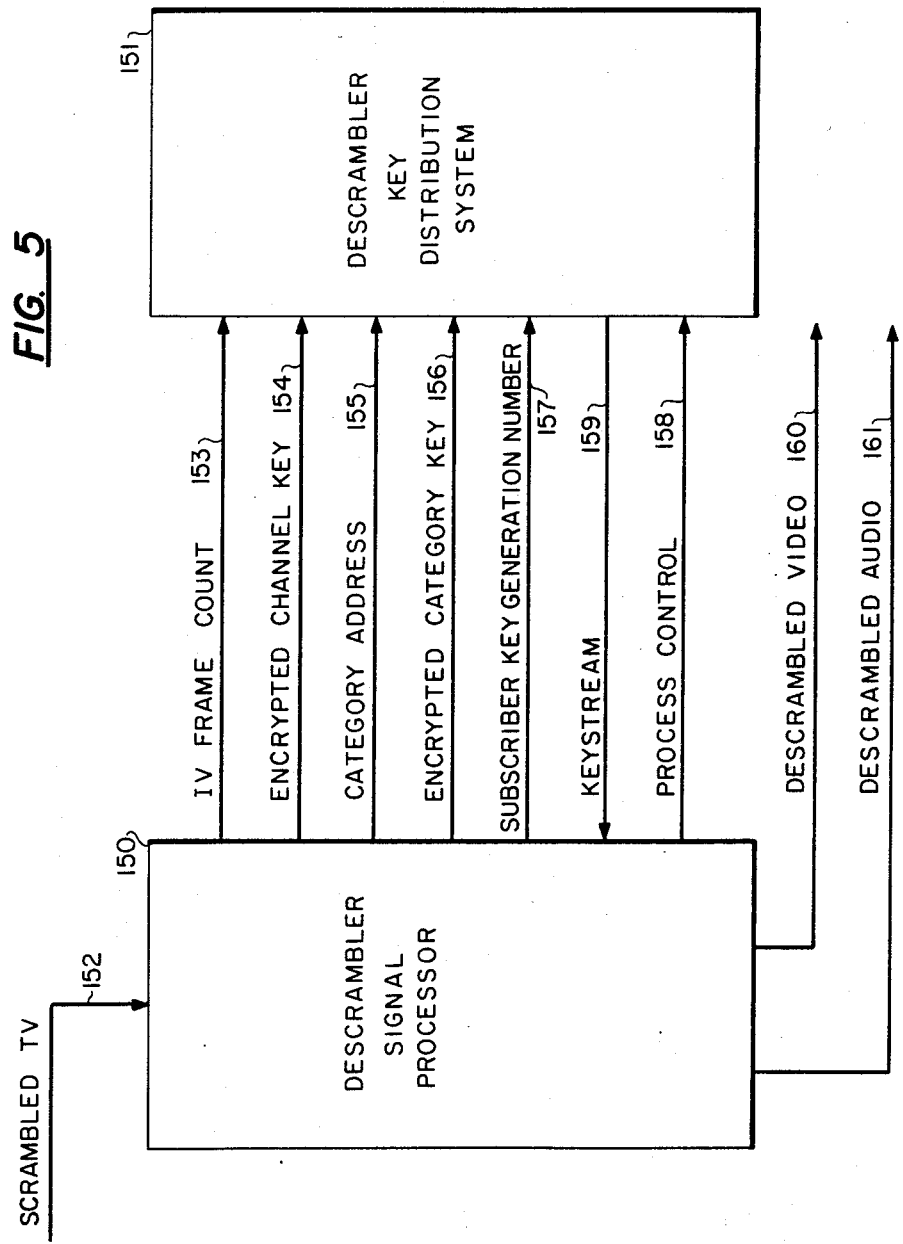
FIG. 5 is a block diagram of a preferred embodiment of a descrambling system according to the present invention.

The process control signals on lines 20 effect control of various processes in the scrambler signal processor 10 and the descrambling system of FIG. 5.

Figure 2:
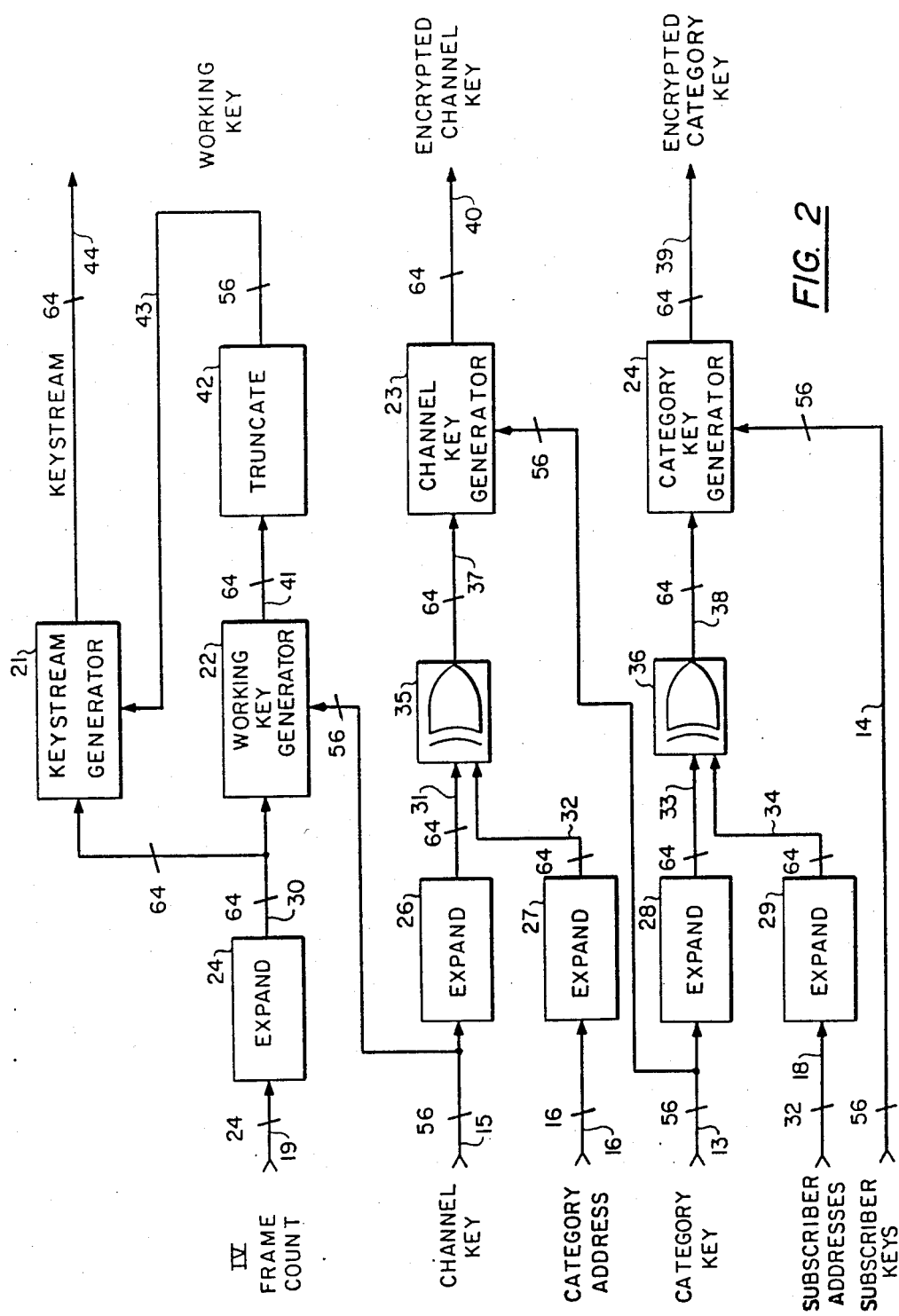
FIG. 2 is a block diagram of a preferred embodiment of the scrambler key distribution system included in the system of FIG. 1.

Referring to FIG. 2, the scrambler key distribution system 11 includes a keystream generator 21, a working key signal generator 22, an encrypted channel key signal generator 23 and an encrypted category key signal generator 24. The scrambler key distribution system of FIG. 2 further includes five expansion function elements 25, 26, 27, 28 and 29 for expanding the signals respectively received from the control computer 12 on lines 19, 15, 16, 13 and 18 to 64 bits. Expansion is accomplished by adding various sets of predetermined bit combinations to the end of each of the respectively received signals so that the word lengths match. Such expansion is implemented by programmed operation of a microprocessor. Accordingly a 24-bit initialization vector signal on line 19 is expanded to a 64-bit signal on line 30; the 56-bit channel key signal on line 15 is expanded to a 64-bit signal on line 31; the 16-bit category address signal on line 16 is expanded to a 64-bit signal on line 32; the 56-bit category key signal on line 13 is expanded to a 64-bit signal on line 33; and the 32-bit subscriber address signal on line 18 is expanded to a 64-bit signal on line 34.

In addition, the scrambler key distribution system of FIG. 2 includes two exclusive-OR logic elements 35 and 36. The logic element 35 exclusive-OR's the selected channel key signal on line 31 with the category address signal on line 32 to provide a scrambled selected channel key signal on line 37. The logic element 36 exclusive-OR's the common category key signal on line 33 with the subscriber address signal on line 34 to provide a scrambled common category key signal on line 38.

Figure 3:
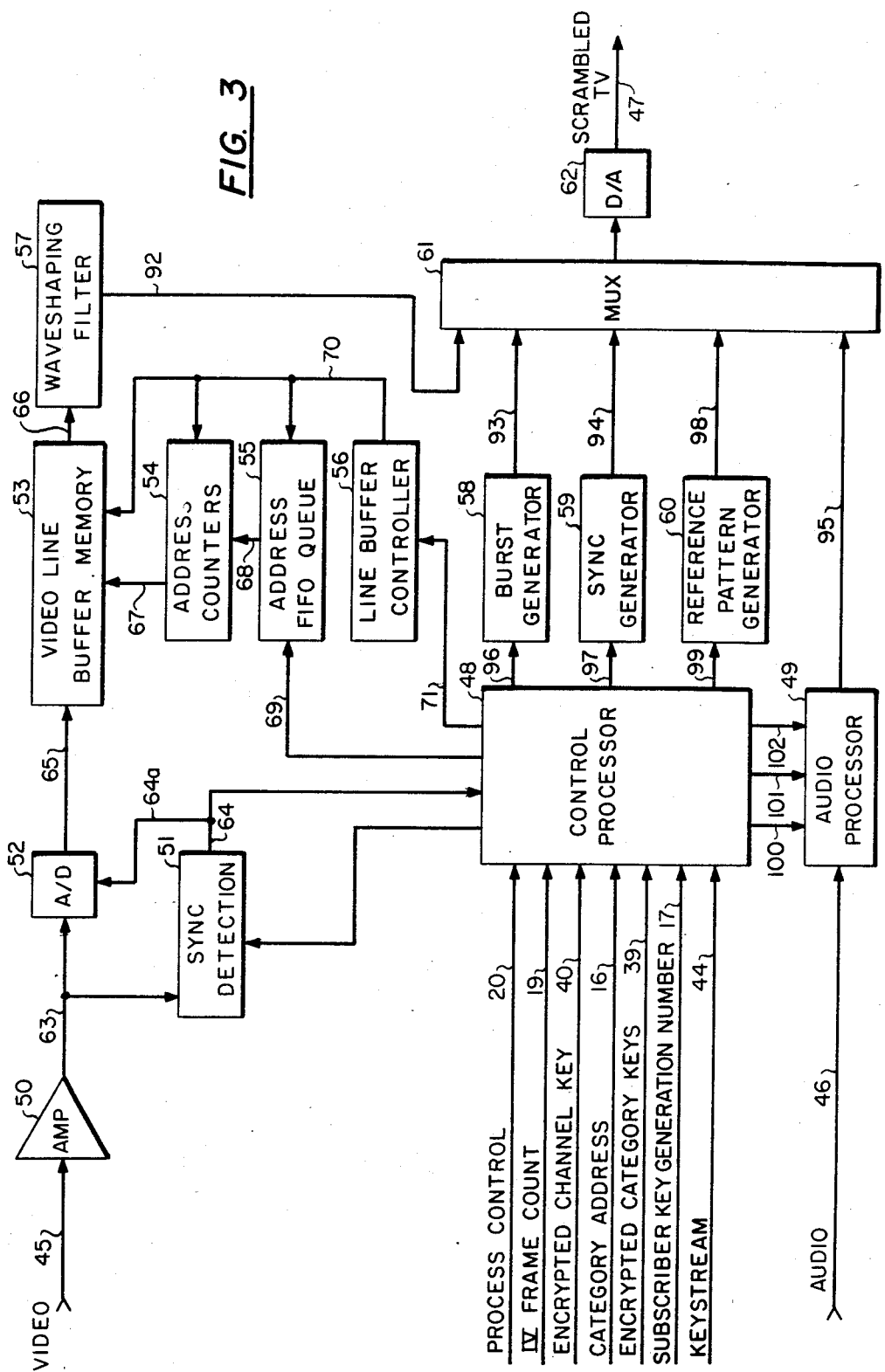
FIG. 3 is a block diagram of the scrambler signal processor included in the system of FIG. 1.

The encrypted category key signal generator 24 generates a group of unique 64-bit encrypted category key signals individually addressed to different selected subscribers' descramblers by processing the scrambled common category key signal on line 38 in accordance with the DES encryption algorithm upon the DES algorithm being keyed by the group of unique subscriber key signals received on line 14 from the control computer 12. The group of encrypted category key signals are provided sequentially on line 39 to the scrambler signal processor 10 (FIGS. 1 and 3).

The encrypted channel key signal generator 23 generates a 64-bit encrypted channel key signal by processing the scrambled selected channel key signal on line 37 in accordance with the DES encryption algorithm upon the DES algorithm being keyed by the generated common category key signal received on line 13 from the control computer 12. The encrypted channel key signal is provided on line 40 to the scrambler signal processor 10.

The working key signal generator 22 generates a 64-bit working key signal by processing the initialization vector signal on line 30 in accordance with the DES encryption algorithm upon the DES algorithm being keyed by the generated channel key signal on line 15. The generated working key signal is provided on line 41 and truncated by a truncation function element 42 to a 56-bit signal on line 43. Truncation is accomplished by deleting the last eight bits from the 64-bit signal. In the preferred embodiment, a new working key is generated every four TV frames or at a 7.5 Hz rate.

The keystream generator 21 generates a unique 64-bit keystream by processing the initialization vector signal on line 30 in accordance with the DES encryption algorithm upon the DES algorithm being keyed by the working key signal on line 43. The unique keystream is provided on line 44 to the scrambler signal processor 10.

Referring to FIG. 1, the scrambler signal processor 10 scrambles a video signal received on line 45 and an audio signal received on line 46 in accordance with the unique keystream received on line 44 to provide a scrambled television signal on line 47.

Referring to FIG. 3, the scrambler signal processor 10 includes a control processor 48, an audio processor 49, a video amplifier 50, a sync detection circuit 51, an analog-to-digital (A/D) converter 52, a video line buffer memory 53, address counters 54, an address FIFO (first-in/first-out) queue 55, a line buffer controller 56, a waveshaping filter 57, a burst generator 58, a sync generator 59, a reference pattern generator 60, a multiplexer (MUX) 61 and a digital-to-analog (D/A) converter 62. The operation of the control processor 48 is controlled by process control signals provided on line 20 by the control computer 12.

The video signal on line 45 is scrambled in accordance with one portion of each frame of the unique keystream on line 44. The audio signal on line 46 is scrambled by the audio processor 49 in accordance with a different portion of each frame of the unique keystream from line 44 that is provided to the audio processor on line 63.

The video amplifier 50 amplifies the video signal on line 45 and filters the same to remove any extraneous or harmonic signals. The amplified and filtered video signal is provided on line 63 to the A/D converter 52 and the sync detection circuit 51. The sync detection circuit 51 detects the vertical and horizontal synchronization signals in the video signal on line 63 and responds thereto by providing synchronization control and clocking signals on lines 64 to the control processor 48. Among these clocking signals is a 14.32 MHz signal, which is at four times the color subcarrier frequency of an NTSC video signal, and which is also provided by the sync detection circuit 51 on line 64a to clock the A/D converter 52.

The A/D converter 52 converts the amplified video signal on line 63 into a digital video information signal on line 65 at the sampling rate of 14.32 MHz to provide 910 8-bit samples per video line. The active video information corresponds to 744 samples in each line.

The video line buffer memory 53 stores the digital video signal on line 65 in four groups of four video information lines each. Each stored video information line includes 744 8-bit samples of active video information. A first group includes four consecutive odd-numbered lines from the same video field. A second group includes the next four consecutive odd numbered lines from the same video field. A third group includes four consecutive even-numbered lines from the same video field, and the fourth group includes the next four consecutive even-numbered lines from the same video field. One group of odd-numbered lines is stored in the memory 53 while the information from the previously-stored group of odd-numbered lines is retrieved from the memory 53 to form a four-line group of odd-numbered scrambled video information line on line 66. Likewise, one group of even-numbered lines is stored in the memory 53 while the information from the previously stored group of even-numbered lines is retrieved from the memory to form a four-line group of even-numbered scrambled video information lines on line 66. Video scrambling is accomplished by retrieving the active video information from the memory in a sequence different from that in which it was stored.

The address counters 54 provide the respective addresses on line 67 to the memory 53 for storing and retrieving video information. These addresses are provided to the address counters 54 on line 68 via the address FIFO queue 55 and line 69 from the control processor 48 in accordance with the unique keystream provided to the control processor 48 on line 44.

The line buffer controller 56 provides clocking and control signals on lines 70 for synchronizing the operations of the address FIFO queue 55, the address counters 54 and the memory 53 in accordance with clocking and synchronization control signals provided on line 71 by the control processor 48. The control processor 48 provides the clocking and synchronization control signals on lines 71 in response to the clocking and synchronization control signals received on lines 64 from the sync detection circuit 51.

Scrambling is accomplished within four-line groups. Two control bits of the keystream on line 44 designate which lines within a given, stored four-line group are to be paired for forming a corresponding pair of scrambled video information lines. The relative lengths of the retrieved portions in each pair of scrambled lines is designated by six control bits in the keystream, which indicate a cutpoint as being after a given number of segments from the beginning of the line.

Another five control bits of the keystream on line 44 designate the sequence within a four-line group in which the scrambled lines are formed. Twenty-four different sequences are possible. Thus nineteen bits of the keystream are used every four video line times to select one of $3 \times 62 \times 24 = 276,768$ possible scrambling patterns. Descrambling requires local generation of the identical keystream in the descrambler.

To further obscure the location of the cutpoint, the waveshaping filter 57 adjusts the values of the adjacent extremities of the retrieved portions of each scrambled line to smooth over any fast rise-time edges.

The waveshaping filter 57 provides a smooth transition between two nine-bit samples in a digital data stream separated by six clock periods. The process involves generating a plurality of interpolated values between the two selected samples in different adjacent retrieved portions of each scrambled line and inserting samples having the interpolated values in the stream of data between the selected samples.

These interpolated values effectively smooth out any abrupt differences between the two selected samples.

The waveshaping filter 57 inserts the interpolated values to smooth out the scrambled video signal on line 66 only during a five-sample period overlapping the transition between adjacent retrieved portions of each scrambled line in response to a control signal provided by the control processor during the five-cycle period.

The waveshaping filter output signal is provided from the output register 83 on line 92. The scrambled video information lines on line 92 are multiplexed by the multiplexer 61 with a six-cycle sync burst data signal on line 93 from the burst generator 58, a horizontal sync pulse data signal on line 94 from the sync generator 59 and scrambled digital audio signals and control signals on line 95 from the audio processor 49. The operation of the multiplexer 61 is controlled by the control processor 48. The output of the multiplexer 61 is converted to an analog signal by the D/A converter 62 to provide a scrambled TV signal on line 47.

The burst generator 58 provides the six-cycle sync burst data signal on line 93 in response to a control signal on line 96 from the control processor 48. The sync burst component of the signal on line 47 is locked to and at the same frequency and phase as the color burst component of the video signal on line 63 detected by the sync detection circuit 51. If the video program source is monochrome, data for the phase and frequency of the six-cycle burst is provided from a memory in the control processor 48.

The sync generator 59 provides the horizontal sync pulse data signal on line 94 in response to a control signal on line 97 from the control processor 48. A shortened horizontal sync pulse is retained so that the scrambled signal can pass through telephone company equipment, which contains circuitry which clamps on this pulse. Without any horizontal pulse, the telephone company equipment would distort the signal in an unrecoverable manner.

In the scrambled TV signal on line 47, the horizontal sync pulse occupies sample periods 1 through 18; the 6-cycle sync burst occupies sample periods 19 through 42; a scrambled audio signal and control signals occupy sample periods 43 through 134 and the scrambled video information lines occupy the remaining sample periods.

Scrambling does not take place during lines 1 through 9 of each video field. During line 1 of the first video field, the multiplexer 61 causes IRE reference level data signals and a synchronization sequence data signal to be inserted in the scrambled video signal during the sample periods otherwise occupied by the active video information. The reference level data and synchronization sequence data signals are provided on line 98 by the reference pattern generator 60 in response to control signals on line 99 from the control processor 48.

The signals on lines 93, 94 and 98 all are digital signals.

The synchronization sequence signal is used by the descrambler for frame and sample synchronization as well as for control of AGC (automatic gain control) amplifier gain.

The audio signal on line 46 is digitized and scrambled by the audio processor 49 in accordance with an audio encryption portion of the keystream received on line 44 by the control processor 48 and passed through to the audio processor on line 100.

A group of control signals including the IV frame count signal on line 19, the encrypted channel key signal on line 40, the category address signal on line 16, the encrypted category key signals on line 39, the subscriber key generation number on line 17 and certain of the process control signals on line 20 intended for the descrambler are provided on line 101 to the audio processor 49, which multiplexes the group of control signals on line 101 with the scrambled audio signals. The audio processor time-compresses each interval of the scrambled audio signal corresponding to the duration of a video signal line into an interval corresponding to an NTSC video signal horizontal sync pulse. The audio processor 49 provides the multiplexed control signals and time-compressed scrambled audio signal on line 95 to the multiplexer 95 only during sample periods 43 through 134. This interval corresponds to the interval of the horizontal sync pulse in an NTSC video signal line. The time-compression and timing functions of the audio processor 49 are synchronized and clocked in response to synchronization control and timing signals provided by the control processor on line 102 in response to synchronization control and timing signals received by the control processor 48 on lines 64 from the sync detection circuit 51 upon detecting the color burst in the video signal on line 63. If the video signal on line 63 is derived from a monochrome program source, the control processor 48 derives the synchronization and control signals provided on line 102 from internally stored phase and frequency data and from the detection of the horizontal sync pulses by the sync detection circuit 51.

The preferred embodiment of the scrambler signal processor of FIG. 3 is further described in a copending U.S. patent application entitled "Video Scrambling and Descrambling Systems", filed on even date herewith by Jerrold A. Heller and Woo H. Paik, the entire disclosure of which is incorporated herein by reference.

Figure 4:
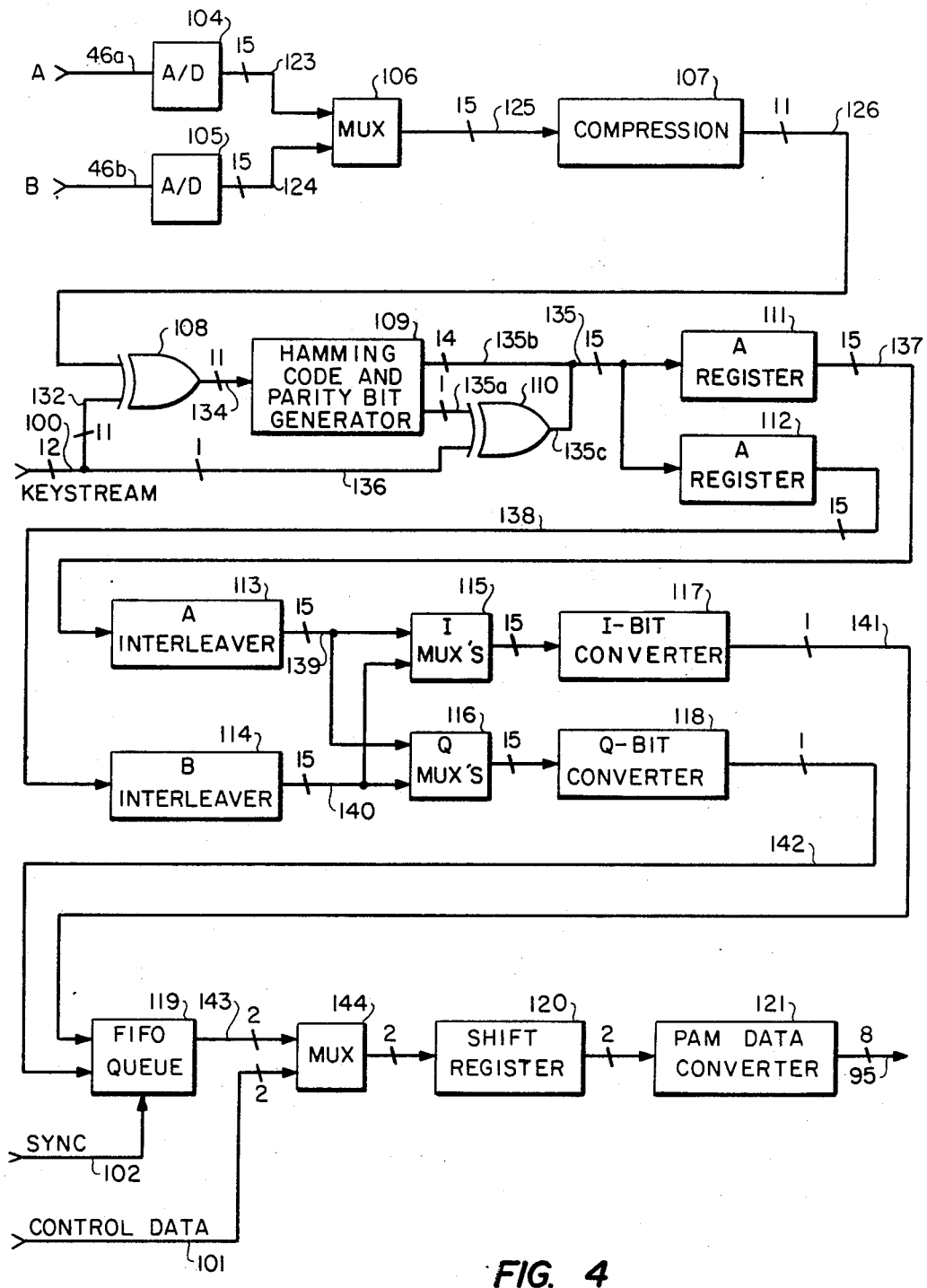
FIG. 4 is a block diagram of the audio processor included in the scrambler signal processor of FIG. 3.

Referring to FIG. 4, the preferred embodiment of the audio processor 49 shown in FIG. 3 includes a first analog-to-digital (A/D) converter 104, a second A/D converter 105, a multiplexer (MUX) 106, a data compression system 107, a first exclusive-OR logic element 108, a Hamming Code and parity bit generator 109, a second exclusive-OR logic element 110, an A-channel register 111, a B-channel register 112, an A-channel interleaver 113, a B-channel interleaver 114, I-bit multiplexers 115, Q-bit multiplexers 116, an I-bit converter 117, a Q-bit converter 118, a FIFO queue 119, a shift register 120, a pulse-amplitude-modulated (PAM) data converter 121 and a digital-to-analog (D/A) converter 122.

The audio processor of FIG. 4 scrambles stereo audio signals received on A channel 46a and B channel 46b. The A/D converters 104, 105 convert analog audio signals on A and B channels 46a, 46b into 15-bit digital signal samples on line 123 and 124 corresponding to the respective analog audio signals. The A/D converters 104, 105 sample the analog audio signals at a sampling rate of 44.055 kHz, which is the same as the sampling rate for NTSC video tape recorders. There are several reasons for this choice. Coherence with the video signal decreases the overall hardware complexity. This reduces costs and increases reliability. The consumer hardware currently available, VTR adapters and soon to be released Compact Disc digital audio system, are compatible with this rate. A full twenty kHz frequency response is possible with 44.055 kHz which is not the case with 32 kHz.

Another reason to chose 44.055 kHz over 44.1 kHz lies in the video taping process. The 24 Hz cinema frame rate is converted to 30 Hz by repeating one frame in five, and the color frame rate, 29.97 Hz, is then created by slowing down slightly. However, for the video and audio to remain synchronous, the audio must also be slowed. The analogous procedure for audio would be to transcode 48 kHz digital audio to 44.1 kHz (assuming one didn't have 44.1 kHz to start with) and then play back the tape with the audio at a 44.055 kHz rate. This is the case because the ratio of 30/29.97 is exactly equal to 44.1/44.055. Since 48 kHz to 44.1 kHz transcoding will be required for compact disc production, no new hardware will be required for transcoding if 44.055 kHz is the sampling rate. And, finally, a considerable effort is being expended by industry toward cost reductions related to the Compact Disc system. Future satellite systems can utilize this advantage. The digital audio sampling rate clock is generated by dividing a four-times-color-burst (14.318 MHz)-derived clocking signal by 325.

The multiplexer 106 includes fifteen 2-to-1 line multiplexers which operate at the sampling rate of 44.055 kHz to place alternating 15-bit samples from channels A and B onto lines 125.

The compression system 107 compresses the 15-bit digital signal sample on lines 125 into an eleven-bit signal sample on lines 126 having a sign bit S, three exponent bits $E\emptyset$, E1 and E2 and seven mantissa bits $M\emptyset$, M1, M2, M3, M4, M5 and M6.

The compressed digital signal sample is scrambled by the exclusive-OR logic element 108, which exclusive-OR's each compressed digital signal sample on lines 126 with eleven bits of a unique keystream on 132 to provide a scrambled compressed signal sample on line 134. The unique keystream on line 132 is provided via line 100 from the keystream generator 21 (FIG. 2).

The Hamming code and parity bit generator 109 generates error detection and correction bits for each compressed signal sample on lines 134 and adds the generated bits thereto to provide error-encoded, compressed signal samples on lines 135. The parity bit is provided on line 135a and the remaining bits are provided on lines 135b.

The exclusive-OR logic element 110 scrambles the parity bit on line 135a with a keystream bit on line 136 from the keystream register 133. The scrambled parity bit is provided on line 135c.

The Hamming code generator portion of generator 109 generates three code bits $C\emptyset$, C1 and C2 for correcting singular errors in a combination of the sign bit S, the exponent bits $E\emptyset$, E1 and E2 and the code bits $C\emptyset$, C1 and C2. Code bit $C\emptyset$ is generated by exclusive-OR'ing the sign bit S, exponent bit $E\emptyset$ and exponent bit E2. Code bit C1 is generated by exclusive-OR'ing the sign bit S, exponent bit $E\emptyset$ and exponent bit E1. Code bit C2 is generated by exclusive-OR'ing exponent bits $E\emptyset$, E1 and E2.

The parity bit generator portion of the generator 109 generates a parity for detecting double errors in a combination of the sign bit S, the three exponent bits and the three code bits and for further detecting an error in the most significant mantissa bit M6 and/or the parity bit. The parity bit P is generated by exclusive-OR'ing the sign S, exponent bit E1, exponent bit E2, mantissa bit M6 and "1".

The error-encoded signal samples derived from the A-channel 46a are buffered in the A-channel register 111 and the error-encoded signal samples derived from the B-channel 46b are buffered in the B-channel register 112.

The A-channel signal sample is provided on line 137 from the A-channel register 111 to the A-channel interleaver 113, which interleaves bits from a plurality of successive A-channel samples.

The B-channel signal sample is provided on line 138 from the B-channel register 112 to the B-channel interleaver 114, which interleaves bits from a plurality of successive B-channel samples.

The combination of the I-bit multiplexers 115, the Q-bit multiplexers 116, the I-bit converter 117 and the Q-bit converter 118 cooperate to serialize the interleaved bits on lines 139 and 140 from the A-channel and B-channel interleavers, 113 and 114, respectively, in order to separate the bits from any single signal sample by at least a predetermined duration associated burst errors caused by FM discriminator clicks. By separating the bits from any single sample by at least the duration of an FM discrmination click, it is possible to spread the error burst so that only one bit in each error encoded signal sample on lines 137 and 138 is affected, whereby single bit errors can be detected and corrected by a Hamming code error corrector in the descrambler. Empirical results indicate that a separation distance of seven sample periods is adequate for error bursts associated with FM discriminator clicks.

Two-bit digital words containing bits I and Q are provided serially on lines 141 and 142 from the I-bit converter 117 and the Q-bit converter 118. The I-bit converter 117 is a 15-bit parallel-to-serial converter for providing the I-bit on line 141. The Q-bit converter 118 is a 15-bit parallel-to-serial converter for providing the Q-bit on line 142. The two-bit digital word on lines 141 and 142 subsequently is processed in such a manner (as described below) that there is a lower error rate in the I-bit position The I-bit multiplexers 115 and the Q-bit multiplexers 116 combine the interleaved signal samples on lines 139 and 140 to place the sign bit S, the exponent bits E0, E1 and E2, the code bits C0, C1 and C2 from both the A and B channels and the parity bit P from the A-channel in the I-bit position in the digital word by providing these eight to the I-bit converter 117, and to place the mantissa bits M0 through M6 from both the A and B channels and the parity bit P from the B channel in the Q-bit position in the digital word by providing these eight bits to the Q-bit converter 118.

The digital word signals on lines 141 and 142 are time-compressed by the FIFO queue 119. The FIFO queue 119 time-compresses each interval of the digital-word signals corresponding to the duration of a video signal line into an interval corresponding to the duration of a video signal horizontal sync pulse. Each time-compressed interval of signals is provided on lines 143 from the FIFO queue to the multiplexer 144 at the video signal line rate during the period normally occupied by the horizontal sync pulse in an NTSC video signal line. During horizontal sync pulse interval, the two-bit words are provided on line 143 at a rate of 7.16 megasymbols per second. Forty-two bit pairs per horizontal sync pulse interval are sent. This corresponds to 42 bits for each of the two audio channels or 2.8 samples per channel per horizontal sync interval.

The time-compression and timing functions of the FIFO queue 119 are synchronized and clocked in response to synchronization control and timing signals provided on line 102.

Two pairs of control data bits also are provided on line 101 to the multiplexer 144 during each horizontal sync pulse interval following the provision of the forty-two bit pairs on line 143. The multiplexer 144 multiplexes the forty-two time-compressed bit pairs on line 143 and the two control data bit pairs on line 101 and provides a series of four-four two-bit words to the shift register 120 during each horizontal sync pulse interval.

The two-bit digital words in the shift register 120 are converted by the PAM data converter 121 into 8-bit digital PAM data signals on lines 95 which when converted into an analog signal by digital-to-analog conversion provide a pulse-amplitude-modulated signal having a level related to the binary value of the digital words.

The D/A converter 62 (FIG. 3) converts the digital PAM data signals on lines 95 to provide pulse-amplitude-modulated scrambled audio signals during the horizontal sync pulse interval of the scrambled video signal on line 160.

The preferred embodiment of the audio processor of FIG. 4 is described in more detail in a co-pending U.S. patent application by Woo H. Paik, Jerrold A. Heller and Gordon Kent Walker entitled "Digital Audio Scrambling System with Error Conditioning", the entire disclosure of which is incorporated herein by reference.

The scrambled television signal on line 47 is broadcast to the descrambling systems in the subscription television system.

Referring to FIG. 5, the preferred embodiment of each descrambling system includes a descrambler signal processor 150 and a descrambler key distribution system 151.

The descrambler signal processor 150 receives the scrambled television signal on line 152. From the received scrambled television signal on line 152, the descrambler signal processor separates and provides to the descrambler key distribution system, the IV frame count signal on line 153, the encrypted channel key signal on line 154, the category address signal on line 155, the encrypted category key signals on line 156, the subscriber key generation number on line 157 and various process control signals on line 158 that are related to the operation of the descrambler key distribution system 151.

The descrambler key distribution system 151 responds to these signals received on lines 153 from the signal processor by reproducing the unique keystream used to scramble the video and audio components of the scrambled television signal received on line 152 and provides the unique keystream to the descrambler signal processor on line 159.

The descrambler signal processor 150 descrambles the scrambled television signal on line 152 in accordance with the unique keystream received on line 159 to provide a descrambled video signal on line 160 and a descrambled audio signal on line 161.

Figure 6:
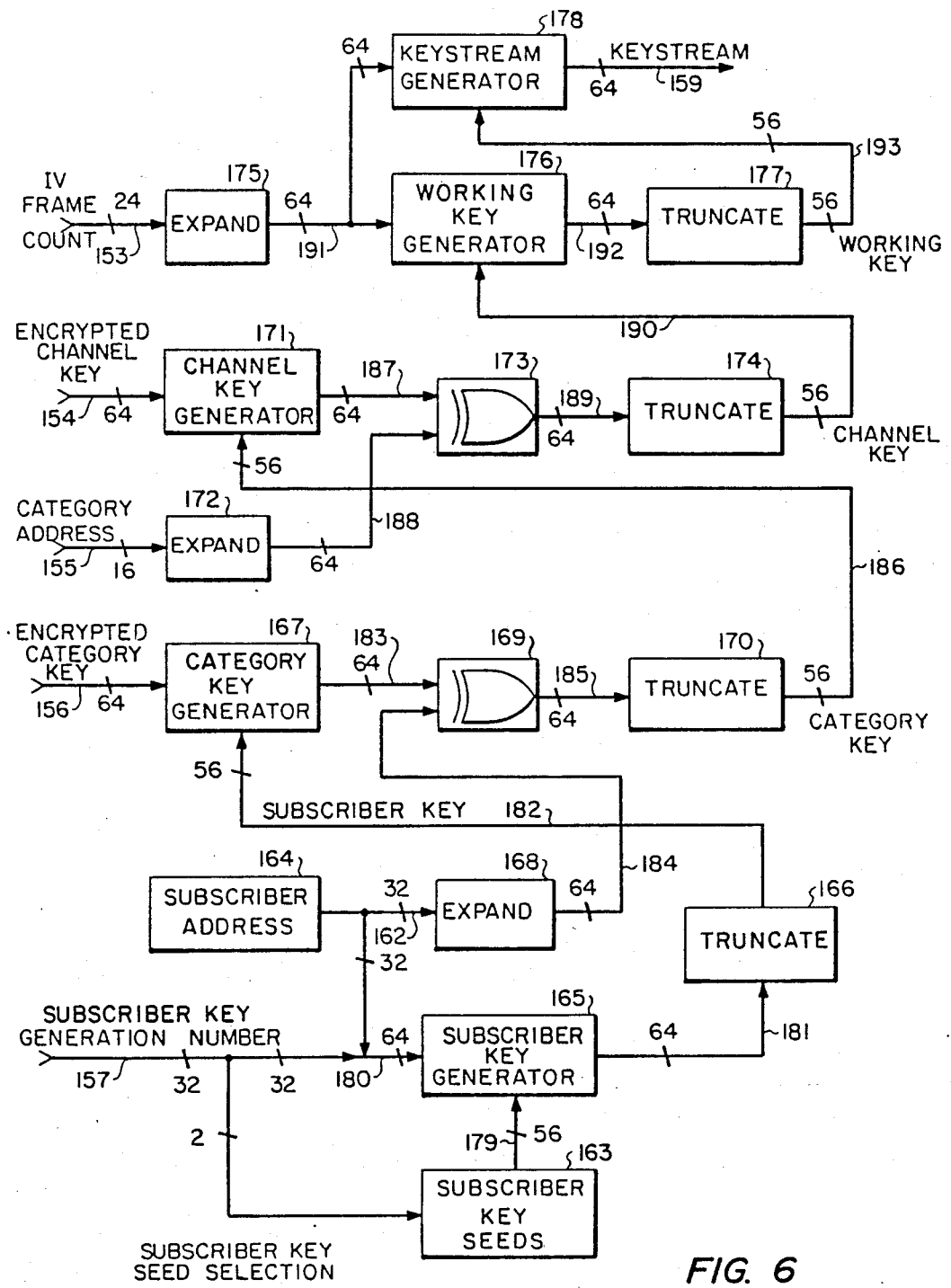
FIG. 6 is a block diagram of the descrambler key distribution system included in the system of FIG. 5.

Referring to FIG. 6, the descrambler key distribution system include a secure memory 163 storing subscriber key seed signals, a memory 164 storing a subscriber address that is unique to the descrambler, a subscriber key signal generator 165, a first truncation function element 166, a category key signal generator 167, a first expansion function element 168, a first exclusive-OR logic element 169, a second truncation function element 170, a channel key signal generator 171, a second expansion function element 172, a second exclusive-OR logic element 173, a third truncation function element 174, a third expansion function element 175, a working key signal generator 176, a fourth truncation function element 177 and a keystream generator 178.

The memory 163 is addressed by two-bits included in a given position of the 32-bit system key generation number received on line 157 to provide one of four stored subscriber 56-bit key seed signals on line 179.

The 32-bit unique subscriber address stored in the memory 164 is combined with the 32-bit subscriber key generation number received on line 157 to provide a 64-bit subscriber key generation signal on line 180.

The subscriber key generator 165 generates a unique 64-bit subscriber key generation signal on line 181 by processing the subscriber key generation signal on line 180 in accordance with the DES encryption algorithm upon the DES algorithm being keyed by the unique subscriber key seed signal on line 179. The last eight bits of the unique subscriber key signal on line 181 are removed by the truncation function element 166 to provide a unique 56-bit subscriber key signal on line 182 identical to the unique subscriber key signal that was provided on line 14 to key the category key generator 24 in the scrambling system (FIG. 2) to generate the unique encryption category key signal addressed to the descrambler.

Since the content of the subscriber key signal generated on line 181 by the subscriber key generator 165 depends upon the content of the subscriber key seed signal retrieved on line 179 from the secure memory it is essential that the two address bits in the subscriber key generation number address the location in the secure memory 163 containing the subscriber key seed signal that will key generation of a unique subscriber key signal identical to the one used in the scrambling system to key the generation of the unique encrypted category key signal addressed to the descrambler.

When the category key generator 167 receives a unique encrypted category signal addressed thereto on line 156 and the unique subscriber key signal is provided on line 183, the category key generator 167 generates a decrypted 65-bit category key signal on line 183 by processing the encrypted category key signal received on line 156 in accordance with the DES encryption algorithm upon the DES algorithm being keyed by the unique subscriber key signal on line 182.

The unique 32-bit subscriber address stored in the memory 164 is provided on line 162 and expanded by the expansion function element 168 to provide a 64-bit unique subscriber address signal on line 184 identical to the unique subscriber address signal corresponding to the descrambler provided on line 34 of the scrambling system (FIG. 2). To provide such identity the expansion function elements 168 and 29 (FIG. 2) add identical 32-bit patterns to the respective unique address signals on lines 162 and 18.

The exclusive-OR logic element 169 exclusive-OR's the decrypted category key signal on line 183 with the expanded unique address signal on line 184 to provide a descrambled 64-bit category key signal on line 185. The last eight bits of the category key signal on line 185 are removed by the truncation function element 170 to reproduce the 56-bit common category key signal on line 186 identical to the common category key signal provided on line 13 by the control computer in the scrambling system (FIG. 2).

When the common category key signal is reproduced on line 186, the channel key generator 171 generates a decrypted 64-bit channel key signal on line 187 by processing the encrypted channel key signal received on line 154 in accordance with the DES encryption algorithm upon the DES algorithm being keyed by the common category key signal on line 186.

The 16-bit category address signal received on line 155 is expanded by the expansion function element 172 to provide a 64-bit category address signal on line 188 identical to the 64-bit category address signal provided on line 32 in the scrambling system (FIG. 2). The expansion function elements 172 and 27 (FIG. 2) add identical 48-bit patterns to the respective signals on lines 155 and 16.

The exclusive-OR logic element 173 exclusive-OR's the decrypted channel key signal on line 187 with the expanded category address signal on line 188 to provide a descrambled 64-bit channel key signal on line 189. The last eight bits of the channel key signal on line 189 are removed by the truncation function element 174 to reproduce the 56-bit channel key signal on line 190 identical to the channel key signal initially provided on line 15 by the control computer in the scrambling system (FIG. 2).

The 24-bit initialization vector frame count signal received on line 153 is expanded by the expansion function element 175 to provide a 64-bit initialization vector signal on line 191 identical to the initialization vector signal provided on line 30 of the scrambling system (FIG. 2). The expansion function elements 175 and 25 add identical 40-bit patterns to the respective initialization vector signals on lines 153 and 19 (FIG. 2).

When the channel key signal is reproduced on line 190, the working key generator 176 generates a 64-bit working key signal on line 192 by processing the initialization vector signal on line 191 in accordance with the DES encryption algorithm upon the DES algorithm being keyed by the channel key signal on line 190. In the preferred embodiment, a new working key is generated every four TV frames or at a 7.5 Hz rate.

The last eight bits of the working key signal on line 192 are removed by the truncation function element 177 to reproduce the 56-bit working key signal on line 193 identical to the workwing key signal generated on line 43 in the scrambling system (FIG. 2).

When the working key signal is reproduced on line 193, the keystream generator 178 reproduces the 64-bit unique keystream on line 159 by processing the 64-bit initialization vector signal on line 191 in accordance with the DES algorithm upon the DES algorithm being keyed by the working key signal on line 193. The unique keystream reproduced on line 159 is identical to the unique keystream generated on line 44 in the scrambling system (FIG. 2).

Figure 7:
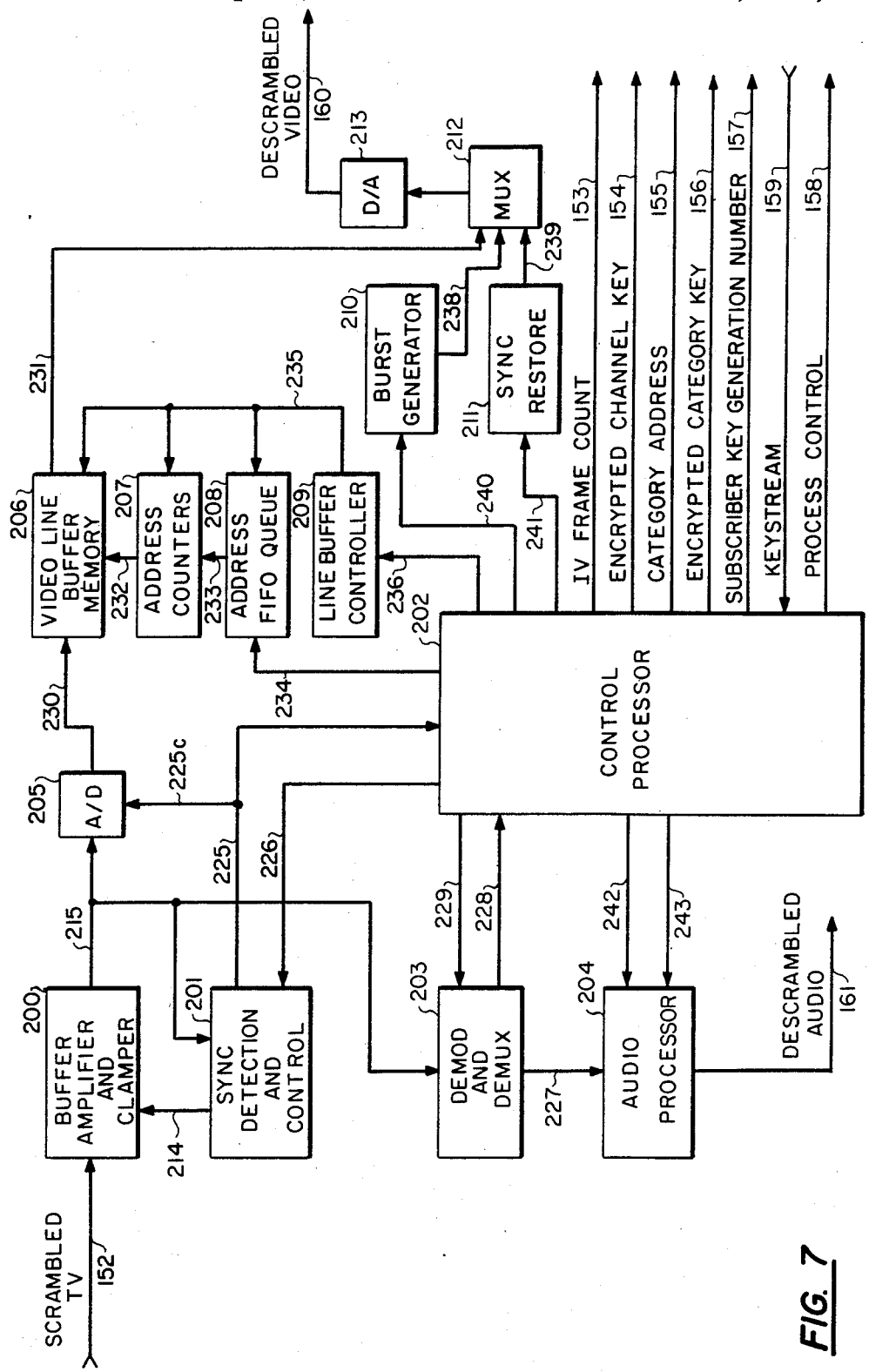
FIG. 7 is a block diagram of the descrambler signal processor included in the system of FIG. 5.

Referring to FIG. 7, the descrambler signal processor 150 includes a buffer amplifier and clamper circuit 200, a sync detection and control circuit 201, a control processor 202, a demodulator and demultiplexer circuit 203, an audio processor 204, an A/D converter 205, a video line buffer memory 206, address counters 207, an address FIFO queue 208, a line buffer controller 209, a burst generator 210, a sync restore generator 211, a multiplexer 212 and a D/A converter 213.

The buffer amplifier and clamper circuit 200 provides an interface for receiving the incoming scrambled television signal on line 152. The buffer amplifier and clamper circuit 200 provide a on line 215 to the sync detection and control circuit 201, the demodulator and demultiplexer circuit 203 and the A/D converter 205.

The sync detection and control circuit 201 includes a sync burst gate, a phase detector, a loop filter, a voltage controlled crystal oscillator (VCXO), a first divide-by-two counter, a second divide-by-two counter, a synchronization sequence detector, an "unprocessed video" detector, and a one shot pulse generator. The phase detector, loop filter, VCXO and both counters form a phase-locked loop that locks onto the 3.58 MHz 6-cycle sync burst component in the scrambled television signal received on line 215 to synchronize the operation of the descrambler with the scrambled TV signal on line 215. The VCXO is tuned to 14.32 MHz. Generation of the sync burst component in the scrambled television signal is described above with reference to FIG. 3.

The synchronization sequence detector in the sync detection and control circuit 201 provides a frame sync signal on line 225 to the control processor 202 in response to detection of a predetermined synchronization sequence in the scrambled TV signal on line 215. The predetermined synchronization sequence is present in line 1 of field 1 of the scrambled TV signal received on line 215, as described above. When the descrambler is unsynchronized, detection of the first synchronization sequence in the signal on line 215 resets a divide-by-910 horizontal line sample counter in the control processor 202. The line sample counter controls circuitry in the control processor 202 that provides a control signal to the one shot pulse generator in the sync detection and control circuit on line 226, which in turn provides a gate signal pulse to the sync burst gate in the sync circuit 201. The gate signal pulse rises at the beginning of the 6-cycle sync burst and enables the sync burst gate to provide the sync burst portion of the scrambled television signal on line 215 to the phase-locked loop.

The gate pulse signal from the one shot pulse generator in the sync circuit 201 is also provided on line 214 to a sample and hold circuit in the buffer amplifier and clamper circuit 200 to synchronize the operation thereof.

When synchronization lock is achieved by the phase-locked loop in the sync circuit 201, a lock signal is provided on line 225 to the control processor 202. When synchronization lock is achieved, the control processor 202 inhibits the reset to its internal line sample counter and monitors the frame sync signal on line 225 for loss of synchronization. If synchronization is lost the control processor 202 runs an algorithm to reacquire synchronization. When the frame sync signal on line 225 is active a horizontal line sync interrupt (HLSYNC) signal is provided within the control processor 202, which uses the HLSYNC signal to count horizontal lines, to time events, and to synchronize hardware and firmware events. When the frame signal on line 225a is active, video frame synchronization occurs because the synchronization sequence signal on line 215 occurs during line 1 of each frame.

The phase-locked loop in the sync circuit 201 provides a 14.32 MHz sampling clock signal on line 225 to the control processor 220 from the output of the VCXO, and further provides a 7.16 MHz bit clock signal on line 225 to the control processor 202 from the output of the first divide-by-two counter.

The "unprocessed video" detector in the sync circuit 201 provides a signal on line 225 to the control processor 220 when a scrambled video signal is detected on line 215.

The demodulator and demultiplexer circuit 203 separates from the scrambled television signal on line 215 those audio and control signals that were pulse amplitude modulated and inserted into the portion of the scrambled television signal normally occupied by the horizontal sync pulse, as described above with reference to FIGS. 3 and 4. The audio signals are provided on line 227 to the audio processor 204 and the control signals are demodulated and provided on line 228 to the control processor 202.

The control signals provided to the control processor 202 on line 228 include the IV frame count signal, the encrypted channel key signal, the category address signal, the unique category key signal addressed to the particular descrambler and the subscriber key generation number, which are passed through the control processor 202 to the descrambler key distribution system 151 on lines 153, 154, 155, 156 and 157, respectively. The control signals provided on line 228 also include process control signals for controlling the operation of both the control processor 202 and the descrambler key distribution system 151, with the latter being passed to the scrambler key distribution system on line 159.

The control processor 202 detects message frame synchronization characters in the process control signal bit stream reaceived on line 228, detects when address bytes are present within the message frame, and performs error checking by on each message. If the current byte is an address byte an address present bit will be set. The control processor 202 uses the three address bytes and the control byte to determine whether the incoming message is a message meant for the control processor 202 in the particular descrambler unit and determines whether the message is a control message or a data message. Control messages are used to send specific authorization and keying information to an individual descrambler unit. Data messages are messages that contain broadcast information, such as the count, key address and number signals on lines 153, 154, 155, 156 and 157.

The control processor 202 regulates the transfer of signals on line 228 from the demodulator circuit 203 by control signals provided to the demodulator circuit on line 229.

The A/D converter 205 converts the scrambled television signal on line 215 into a digital video information signal on line 230 at the sampling rate of 14.32 MHz to provide 910 8-bit samples per video line. A 14.32 MHz sampling clock signal is provided to the A/D converter 205 on line 225c from the synchronization and control circuit 201.

The video line buffer memory 206 stores the digital scambled video information signal on line 230 in four groups of four scrambled video information lines each. Each scrambled video information line includes up to 776 8-bit samples of active video information. A first stored group includes information derived from four consecutive odd-numbered lines from the same video field. A second stored group includes information derived from the next four consecutive odd numbered lines from the same video field. A third stored group includes information derived from four consecutive even-numbered lines from the same video field, and the fourth stored group includes information derived from the next four consecutive even-numbered lines from the same video field. One group of scrambled video information lines derived from the odd-numbered lines is stored in the memory 206 while the information from the previously-stored group of scrambled lines derived from the odd-numbered lines is retrieved from the memory 206 to form a four-line group of odd-numbered descrambled video information lines on line 231. Likewise, one group of scrambled lines derived from the even-numbered lines is stored in the memory 206 while the information from the previously stored group of scrambled lines derived from the even-numbered lines is retrieved from the memory to form a four-line group of even-numbered descrambled video information lines on line 231. Video descrambling is accomplished by retrieving the active video information from the memory 206 in a sequence that is generally the reverse of the storage sequence in the video line buffer memory 53 in the scrambling system shown in FIG. 3.

The address counters 207 provide the respective addresses on line 232 to the memory 206 for storing and retrieving video information. These addresses are provided to the address counters 207 on line 233 via the address FIFO queue 208 and line 234 from the control processor 202 in accordance with the unique keystream provided to the control processor 202 on line 159.

The line buffer controller 209 provides clocking and control signals on lines 235 for synchronizing the operations of the address FIFO queue 208, the address counters 207, and the memory 206 in accordance with clocking and synchronization control signals provided on line 236 by the control processor 202. The control processor 202 provides the clocking and synchronization control signals on lines 236 in response to the clocking and synchronization control signals received on lines 225 from the sync detection and control circuit 201.

Two control bits of the keystream on line 159 designate a pair of lines within a given, descrambled four-line group as destinations for information stored in a corresponding pair of scrambled video information lines. The relative lengths of the retrieved portions in each pair of descrambled lines is designated by six control bits in the keystream, which indicate a cutpoint as being after a given number of segments from the beginning of the line.

Another five control bits of the keystream on line 44 designate the sequence within a four-line group in which the information is retrieved from the scrambled lines. Twenty-four different sequences are possible. Thus nineteen bits of the keystream are used every four video line times to select one of $3 \times 62 \times 24 = 276,768$ possible descrambling patterns. The decrambling pattern is defined by the unique keystream provided on line 159. The unique keystream provided on line 159 in the descrambler signal processor is a reproduction of the unique keystream provided on line 44 to the scrambler signal processor of FIG. 3.

The descrambled video information lines on line 231 are multiplexed by the multiplexer 212 with a nine-cycle color burst data signal on line 238 from the burst generator 210, and vertical and horizontal sync pulse data signals on line 239 from the sync restore generator 211. The operation of the multiplexer 212 is controlled by the control processor 202. The output of the multiplexer 61 is converted to an analog signal by the D/A converter 213 to provide a descrambled video signal on line 160. The descrambled video signal is a typical NTSC video signal.

The burst generator 210 provides the nine-cycle color burst data signal on line 239 in response to a control signal on line 240 from the control processor 202. The color burst component of the descrambled video signal on line 160 is locked to and at the same frequency and phase as the sync burst component of the scrambled video signal on line 152 detected by the sync detection and control circuit 201.

The sync restore generator 211 provides the vertical and horizontal sync pulse data signal on line 239 in response to a control signal on line 241 from the control processor 202.

The control processor 202 causes the components of the descrambled TV signal on line 160 to occur during prescribed intervals with reference to the beginning of the scrambled video line as determined in response to the synchronization control signals received on lines 225 from the sync detection and control circuit 201.

The preferred embodiment of the descrambler signal processor of FIG. 7 is described in more detail in the aforementioned U.S. patent application entitled "Video Scrambling and Descrambling Systems."

The scrambled audio signal in line 229 is digitized and descrambled by the audio processor 204 in accordance with an audio encryption portion of the keystream received on line 159 by the control processor 202 and passed through to the audio processor on line 242. The audio processor 204 provides the descrambled audio signal on line 161.

The audio processor 204 time-expands each interval of the scrambled audio signal on line 227 corresponding to the duration of an NTSC video signal horizontal sync pulse to an interval corresponding to the duration of a video signal line, and thereby reverses the time compression performed by the audio processor 49 in the scrambling system shown in FIG. 1. The audio processor 204 also descrambles the scrambled audio signal received on line 227 and provides a descrambled audio signal on line 161.

The time-expansion and timing functions of the audio processor 204 are synchronized and clocked in response to synchronization control and timing signals provided by the control processor on line 243 in response to synchronization control and timing signals received by the control processor 202 on lines 225 from the sync detection circuit 201 upon detecting the sync burst in the scrambled video signal on line 215.

Figure 8:
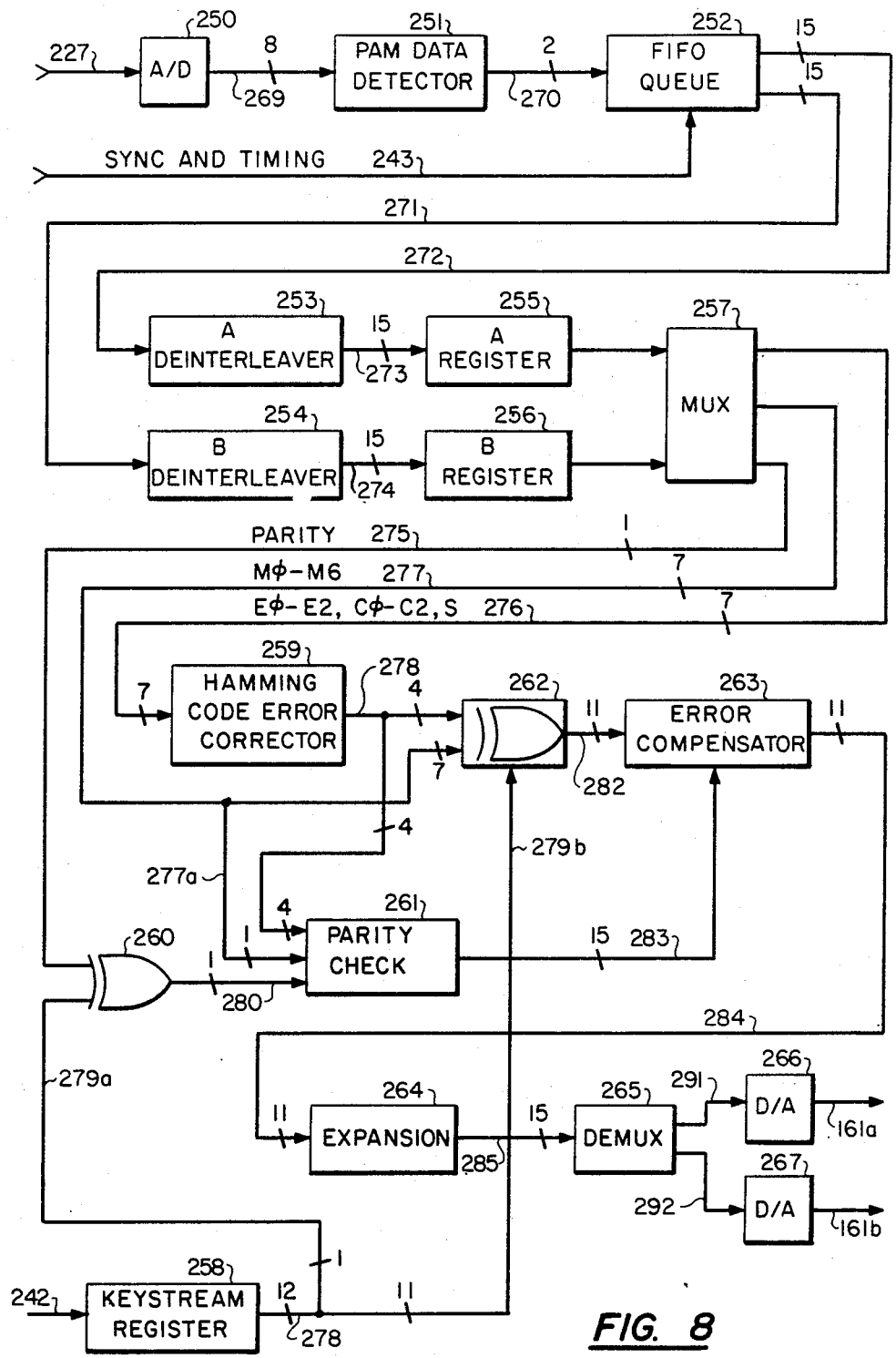
FIG. 8 is a block diagram of the audio processor included in the descrambler signal processor of FIG. 7.

The preferred embodiment of the audio processor 204 is shown in FIG. 8. It descrambles scrambled audio signals scrambled by the audio processor of FIG. 4.

The audio processor of FIG. 8 includes an A/D converter 250, a PAM data detector 251, a FIFO queue 252, an A-channel deinterleaver 253, a B-channel deinterleaver 254, an A-channel register 255, a B-channel register 256, a multiplexer 257, a keystream register 258, a Hamming code error corrector 259, a first exclusive-OR logic element 260, a parity check logic element 261, a second exclusive-OR logic element 262, an error compensator 263, an expansion system 264, a demultiplexer 265, a first D/A converter 266, and a second D/A converter 267.

The A/D converter 250 converts a scrambled analog audio signal received on line 227 into an 8-bit digital PAM data signal which is provided on lines 269 to the PAM data detector 251. The PAM data detector 251 converts the PAM data signals on lines 269 into two-bit digital words and provides the two-bit digital words on line 270 to the FIFO queue.

The FIFO queue 252 time-expands the time-compressed intervals of the digital word signals on lines 270 so that the digital words occurring on line 270 during an interval corresponding to the duration of a horizontal sync pulse are provided at regular intervals over an interval corresponding to the duration of an NTSC video signal line. The operation of the FIFO queue 252 in expanding the time-compressed digital word signals on lines 270 is synchronized and clocked in response to clocking signals and synchronization control signals provided on lines 243.

The FIFO queue 252 converts the serial digital word on lines 270 into parallel 15-bit signals and demultiplexes these 15-bit signals into the interleaved signal samples derived from the A-channel and B-channel interleavers 113 and 114, respectively, in the audio processor of FIG. 4. The 15-bit A-channel signal is provided on lines 271 to the A-channel deinterleaver 253; and the 15-bit B-channel signal is provided on lines 272 to the B-channel deinterleaver 254.

The A-channel deinterleaver 243 deinterleaves the interleaved signal sample on lines 271 to provide a signal sample on lines 273 where all of the bits are from a single signal sample provided on A-channel lines 137 to the A-channel interleaver 113 in the audio processor of FIG. 4.

The B-channel deinterleaver 254 deinterleaves the interleaved signal sample on lines 272 to provide a signal sample on lines 274 wherein all of the bits are from a single sample provided on B-channel lines 138 to the B-channel interleaver in the audio processor of FIG. 4.

The deinterleaved signal samples on lines 273 and 274 are provided to the A-channel register 255 and the B-channel register 256 and multiplexed by the multiplexer 257 to provide the parity bit P on line 275; the exponent bits E0, E1 and E2, the code bits C0, C1 and C2 and the sign bit S on lines 276; and the seven mantissa bits M0 through M6 on lines 277.

The Hamming code error corrector 259 examines the three code bits on lines 276 to detect singular errors in the combination of the exponent bits, code bits and sign bit and corrects any such singular errors. The three exponent bits and the sign bit corrected as necessary are provided by the Hamming code error corrector on lines 278.

The exclusive-OR logic element 260 exclusive-OR's the parity bit P on line 275 with one bit of a unique keystream on line 279a from the keystream register 258 that is identical to the bit provided on line 136 to scramble the parity bit P on line 135a in the audio processor of FIG. 4. The exclusive-OR logic element 260 thereby provides a descrambled parity bit on line 280, which is processed by the parity check logic element 261 with the most significant mantissa bit M6 on line 277a and the error-corrected sign and exponent bits on lines 278 to detect double errors in the combination of the sign and exponent bits and the code bits on lines 276 and to further detect an error in the most significant mantissa bit and/or the parity bit. Such errors are detected when the parity check does not result in unity. The parity check is accomplished by exclusive-OR'ing the bits provided to the parity check logic element 261 on lines 277a, 278, and 280.

The exclusive-OR logic element 262 descrambles the seven mantissa bits on lines 277 and the sign bit and three exponent bits on lines 278 by exclusive-OR'ing these eleven bits with eleven bits of the unique keystream on line 297b from the keystream register 258 that are identical to the keystream bits provided on lines 132 to scramble the sign bit, three exponent bits and seven mantissa bits on lines 126 in the audio processor of FIG. 4.

The keystream bits provided by the keystream register 258 on lines 279 are provided to the keystream register 258 via line 159 from the keystream generator 178 (FIG. 6).

The exclusive-OR logic eleement 262 provides the descrambled bits as a descrambled signal sample on lines 282 to the error compensator 263.

When errors are detected by the parity check logic element 261, an error signal is provided on line 283 to the error compensator 263. If an error signal is not provided on line 283, the error compensator 263, passes the eleven bit descrambled signal sample from lines 282 to the expansion system 264 via lines 284. When an error signal is provided on line 283 the error compensator 263 compensates for the detected errors by repeating on lines 284 the last previous error free signal sample received on lines 282.

The expansion system 264 expands the 11-bit signal samples on lines 284 into a 15-bit digital signal sample on lines 285 that can be converted into an analog audio signal by digital-to-analog conversion.

The demultiplexer 265 separates the A-channel and B-channel digital sample signals provided sequentially on lines 285 and provides the separated signal samples on lines 291 and 292, respectively, to the first and second D/A converters 266 and 267.

The first D/A converter 266 converts the A-channel digital signal samples on lines 291 to an analog audio signal on A-channel line 161a; and the second D/A converter 267 converts the B-channel digital signal samples on lines 292 to an analog audio signal on B-channel line 161b.

The preferred embodiment of the audio processor of FIG. 8 is described in more detail in the aforementioned U.S. patent application entitled "Digital Audio Scrambling System with Error Conditioning".

With the exception of the keystream generator 178, the components of the scrambler key distribution system (FIG. 2) are all contained on a single microprocessor chip, which is preferably a special version of the Intel 8751 Single-Component 8-Bit Microcomputer. The secure memories 163 and 164 are in the internal EPROM of this chip. An alternative to the Intel 8751 is the Motorola 68705P5, which provides a similar capability. The Intel "8751" chip is a stand-alone, high-performance single-chip computer fabricated with HMOS technology and packaged in a 40-pin DIP. It provides the hardware features, architectural enhancements and instruction set necessary to make it an effective controller in this cryptographic application. The EPROM in this special version of the 8751 chip contains 4K bytes of UV erasable read only memory which is only readable on-chip. The architecture does not provide any direct path from the EPROM to outside the chip once the external verify mode has been disabled in the manufacturing process by blowing the "verify mode" fuse. All the firmware that performs the storage of unit key signal and the generation of working keys is contained in this EPROM area.

The extreme difficulty of reading the program stored in the secure EPROM of the 8751 chip also makes it much more difficult for a pirate to make use of lists of subscriber key signals and subscriber addresses, even if he should succeed in breaking the security system of the control computer to obtain the lists. If a pirate knows a valid subscriber key signal, he must also know the entire program contents so that he can store the valid subscriber key signal seeds and subscriber address in the memory. This would be exceeding difficult to do without a complete program listing, which is protected by subscription TV company's security procedures.

There are four levels of DES keys in the preferred embodiment video scrambling system as described above with reference to FIGS. 2 and 6. In order to descramble the scrambled televison signal, the reproduced unique encryption keystream must be reproduced and provided on line 159 to the descrambler signal processor 150. The current working key signal, which is changed very rapidly (7.5 times per second) must be reproduced in order to reproduce the unique encryption keystream. The channel key must also be reproduced in order to reproduce the working key signal. Every channel in the system will have a different channel key signal; and every half hour time block will also have a unique channel key signal. The category definitions, which essentially define different combinations of channels and time blocks, determine which channel key signals will be sent to which subscriber category groups and at which times. The common category key signal is used to encrypt the channel key signals so that they may be broadcast to all members of a category with a single message. Channel key signals are the means by which enabling and disabling are implemented. Category key signals establish the framework for the control system.

Each individual descrambler in the system has four unique subscriber key signal seeds stored in its secure memory 163. Normally, only one of the subscriber key signal seeds is used. The other subscriber key signal seeds are provided as backup to be used in the event that the active subscriber key signal list is somehow compromised.

The next level in the keying system is the category key. The common category key signal is a full 56-bit DES key signal. The encrypted category key signal is sent to each descrambler as a uniquely addressed message and is encrpted using the addressed descrambler's active subscriber key signal. Thus, only the addressed descrambler can read the encrypted category key signal. The encrypted category key signal on line 64 is stored in an EPROM on the 8751 chip. Category key signals are changed whenever the subscription TV company alters a customer's grade of service or once a week, whichever comes first. Note that this update cycle is completely determined by the control computer software and can be changed at any time. The new category key signal is sent to each of the subscribers at least 10 times before it becomes effective, thus providing ample opportunity to receive it correctly, even through the descrambler may not be on at all times. Once received correctly, the new encrypted category key signal on line 64 is stored in the EPROM until it becomes time to activate it. After a new set of category keys become effective, they continue to be sent occasionally so that units that have been off-line for extended periods (such as a vacationer's unit) may be brought back on-line reasonably quickly.

A category is related to a class of service or a type of customer. There may be many categories defined in the system at one time, but a particular descrambler belongs to only one category at a time. Categories may be redefined and reassigned at any time. Examples of possible category groupings follow:
  A. All channels at all times.
  B. Channel 4, 8-12 p.m. Weekdays.
  C. Group B and boxing.
  D. All sports.
  E. Channel 3 at all times.
  F. Channels 3 and 4, 8-12 p.m. Daily.
  G. Boxing and Group B.

Note that a category can be a grouping together of other categories.

The category key signals are used in the following way:

Sixteen address bits are partitioned into a 9-bit field and a 7-bit field. The 9-bit field is used to select one of 512 different tiers, while the 7-bit field is used to allow independent selection of seven "special events" for the week. The special events could be pay-per-view type programs which would have to be specifically requested (and paid for) by the subscriber while the tier group membership would provide access to a particular class of programming. The allocation of the category bits is completely flexible, since the category definitions reside entirely in the control computer and can, therefore, be reprogrammed at any time with no impact on the descrambler units.

This type of partitioning into categories makes it unnecessary to address an individual descrambler unit frequently, thus greatly reducing the required capacity of the control channel.

A new capabililty can be added to a category by defining a new category with the capabilities of the old category plus the new capability. The control computer 12 composes category rekey signals which can then be sent out as process control signals to the descrambler. A subscriber will continue in the system as a member of the old category until his category rekey signal is received.

The third level in the keying system is the channel key. The encrypted channel key signal on line 64 is received by all the members of a category with a single rekeying signal and is stored in the EPROM on the 8751 chip. The channel key signal is encrypted using the category key signal as described above. Hence each descrambler unit of the addressed category group may decrypt the encrypted channel key signal. The channel key signal is normally changed on half hour intervals and is used as the mechanism for enabling and disabling descrambling on a program by program and channel by channel basis. The period of the update cycle is also determined by the control computer software.

There is only a single channel key signal active at a time for each channel in the system. Channel key signals for the current program on a given channel are sent repeatedly so that a descrambler that has just been turned on will receive the current encrypted channel key signal in just a few seconds. The repetition also provides for quick recovery in the event of power transcients that are severe enough to cause the stored encrypted channel key to temporarily be lost. The system normally devotes more of the control data capacity on line 101 to sending channel key signals around the half hour boundaries, plus or minus a few minutes to guarantee that the channel key changeover goes smoothly. The way in which the various functions of the control data capacity are shared is completely determined by the control computer 12 and can be reprogrammed at any time.

The highest level key in the system is the working key. The working key signal is determined by processing the initialization vector (IV) signal in accordance with the DES algorithm, as described above. The initialization vector signal is derived from real time and is sent over the control data line 101 as a broadcast control signal, typically at a rate of once every second. Thus, once a descrambler synchronizes, it will have the IV sequence, and given proper authorization, will also have the channel key signal and can produce working key signals. The working key signal changes at the rate of 7.5 times per second. All of the above key control processes in the descrambler are performed inside the 8751 microprocessor chip, which provides inherent security from the monitoring of its internal processes which could possibly reveal the working key derivation process.

The working key signal on line 193 in the descrambler is output from the 8751 microprocessor chip to the encryption keystream generator 178, which is embodied in an Advanced Micro Devices Am9518 data ciphering processor chip. The Am9518 chip implements the National Bureau of Standards Data Encryption Standard (DES). The Am9518 chip is a high speed multi-ported encryption/decryption processor optimized for high throughput. The Am9518 chip is operated in the Cipher Block Chain (CBC) mode in accordance with Federal Information Processing Standards Publication 46.

The encryption keystream generator 21 in the scrambling system (FIG. 2) is also embodied in an Am9518 chip. The encryption keystream generation process uses the real time frame count as the initialization vector. The Am9518 chip produces the encryption keystream at a rate of 1.4 Megabits/second, which provides an encryption keystream bit for each transmitted audio bit, thus rendering it totally secure from any feasible attack. The Am9518 chip also produces an additional 59 Kilobits/second of keystream bits to be used in the video scrambling process.

The subscription television company maintains a computer file that contains a list correlating descrambler unit serial numbers, unique subscriber address and the active subscriber unique subscriber key signals. This computer file is maintained with a very high level of security, since its disclosure would require changing every descrabler's unique subscriber key seed signals address to one of the backup subscriber key seed signal addresses in order to restore full security. Another computer file contains the relation between subscriber identification numbers and descrambler unit serial numbers. The security of this file is not critical to system security.

Another computer file contains the definitions of the subscriber categories. These definitions are essentially channel masks with 30 minute resolution over a 7 day period. This file is normally edited on a weekly basis to reflect changes in the offerings, program schedules, to add a new category or to delete an old one.

Another computer file contains the relation between categories and subscriber identification numbers. This file is edited to add or delete a subscriber, or to change a subscriber's grade of service. The normal update cycle for this file would be expected to be monthly except to authorize "special events". This is the file that would be primarily affected if it were desired to terminate a subscriber's service. A subscriber can be quickly dumped from the system by sending him a new, unusable category key signal. This will disable him immediately unless he has somehow disabled his descrambler from receiving rekey signals, in which case he would continue to be enabled until the other members of the category were rekeyed at the end of the week. The category's rekeying cycle could also be performed immediately in order to guarantee immediate termination of service.

Another computer file contains the list of category keys for the current and the next week of operation. This file must also be provided with a reasonably high level of security, since its disclosure would permit unauthorized users to obtain service until the security breach is discovered or the keys are updated in the normal cycle.

The encrypted category rekey signals are sent out on all channels in the system so that no matter what channel the subscriber is watching, the message will be received.

The 32-bit subscriber address signal allows over four billion descrambler units to be individually addressed. The address is broken into an 8-bit subfield and a 24-bit subfield. The 24-bit subfield is transmitted as a broadcast message to all 256 members of the 8-bit address subfield that are to be rekeyed next. The broadcast message also contains a bit that indicates whether the key being sent is for the current period of operation or for the next key period. If half of the control data line 101 capacity is devoted to sending category rekey messages, then a 5 million subscriber system would require less than 8 hours for new keys and category information to be sent to every subscriber. Once all the members of a category group have received the new encrypted category signal, a parity check signal is sent to them as a broadcast signal. When a descrambler unit receives an encrypted category rekey signal addressed to it, such signal is stored in the EPROM of the 8751 chip marked as unchecked. When the parity check signal is received and checked, the stored rekey signal is marked as checked and further receptions of the same rekey signal are stored in the EPROM.

An encrypted channel key signal is sent to each category every 30 minutes. Before a set of encrypted channel key signals are sent, they are preceded by a broadcast signal containing a header that indicates that a stream of encrypted channel key signals follows, the most significant 8 bits of the category number, the channel number (8 bits), one bit indicating current/next time period, and the initialization vector signal. Except during the interval around the channel key change time, a portion of the capacity is used to send encrypted channel keys for the other channels in the system so that a channel change by the subscriber would be perceived as instantaneous.

Key change synchronization must be carefully dealt with in order to keep from disrupting the system every time keys are changed. That is the primary reason why real time is used both as the initialization vector signal and to synchronize key changes. Approximately once a second, signals are sent out that define current network time and current key generation as well as the time of the next key change. Repeating these signals frequently both allows new stations to acquire synchronization quickly, and greatly improves the reliability of sending this important information. This also provides for quick recovery from power transients.

By using the tiering scheme described above, all rekeying and control operations can be sent over a 63 Kilobits/sec data link. In each line, a total of 88 bits are transmitted during the horizontal sync interval, of the video signal. Four of the 88 bits are dedicated to the control function, thus providing a control channel bit rate of 63 Kilobits/sec. As described above, the remaining 84 bits per line are used to transmit the scrambled audio signal.

Accordingly, up to 5 million subscribers can be individually addressed in each ten minute interval with control information. The described tiering scheme provides an address pool containing more than four billion unique addresses and addresses every subscriber category with control information in only 12 seconds.

We claim:

1. A subscription television system including a scrambler and a plurality of subscribers' descramblers for respectively scrambling and selectively descrambling television signals, comprising means in each descrambler for providing a subscriber key signal that is unique to said descrambler;

means storing a list of said unique subscriber key signals for the descramblers of the system;

means storing a list defining a hierarchy of common category key signals corresponding to a hierarchy of address groups defined on the basis of subscribers having a common grade of service or other attributes that makes it desirable to address a group of subscribers' descramblers in common;

means for generating from said stored hierarchy list, a common category key signal corresponding to a selected address group in said hierarchy of address groups;

means for generating from said stored subscriber key signal list, a group of unique subscriber key signals corresponding to said selected address group;

means in the scrambler for generating a group of unique encrypted category key signals individually addressed to different selected subscribers' descramblers by processing said generated common category key signal in accordance with a first encryption algorithm upon said first algorithm being keyed by said generated group of unique subscriber key signals;

means in the scrambler for generating a working key signal by processing an initialization vector signal in accordance with a second encryption algorithm upon said second algorithm being keyed by either said generated common category key signal or some other key signal;

means in the scrambler for generating a unique keystream by processing said initialization vector signal in accordance with a third encryption algorithm upon said third algorithm being keyed by said working key signal;

means in the scrambler for scrambling a television signal in accordance with said unique keystream to provide a scrambled television signal;

means for communicating the scrambled television signal, said initialization vector signal, and said group of unique encrypted category key signals to said subscribers' descramblers;

means in each descrambler for reproducing said common category key signal, when said descrambler receives said unique encrypted category key signal addressed thereto, by processing said encrypted category key signal addressed to said descrambler in accordance with said first algorithm upon said first algorithm being keyed by said unique subscriber key signal provided in said addressed descrambler;

means in each descrambler for reproducing said working key signal, when said common category key signal is reproduced in said descrambler, by processing said initialization vector signal in accordance with said second algorithm upon said second algorithm being keyed by either said common category key signal that is reproduced in said descrambler or a key signal that is reproduced in said descrambler in relation to said reproduced common category key signal, consistent with which key signal was used to key the second algorithm in the scrambler;

means in each descrambler for reproducing said unique keystream, when said working key signal is reproduced in said descrambler, by processing said initialization vector signal in accordance with said third algorithm upon said third algorithm being keyed by said working key signal that is reproduced in said descrambler; and means in each descrambler for descrambling said scrambled television signal, when said unique encryption keystream is reproduced in said descrambler, by descrambling said scrambled television signal in accordance with said unique keystream that is reproduced in said descrambler.

2. A system according to claim 1, wherein said first, second and third algorithms all include the "data encryption standard" (DES) algorithm.

3. A system according to claim 1, wherein the scrambling means comprises means for scrambling the video information portion of said television signal in response to one portion of each frame of said unique keystream; and means for encrypting the audio portion of said television signal in response to a different portion of each frame of said unique keystream.

4. A system according to claim 1, comprising a secure memory in each descrambler storing information used for providing said unique subscriber key signal in the descrambler.

5. A system according to claim 1, further comprising means for storing a list defining a plurality of channel key signals respectively corresponding to different time blocks for different television channels in the system;

means for generating a selected channel key signal from said channel key signal list;

means in the scrambler for generating an encrypted channel key signal by processing said selected channel key signal in accordance with a fourth encryption algorithm upon said fourth algorithm being keyed by said generated common category key signal;

means for communicating said encrypted channel key signal to said descramblers and means in each descrambler for reproducing said selected channel key signal, when said common category key signal is reproduced in said descrambler, by processing said encrypted channel key signal in accordance with said fourth algorithm upon said fourth algorithm being keyed by said common category key signal that is reproduced in said descrambler;

wherein the working key signal generating means generates said working key signal by processing said initialization vector signal in accordance with said second encryption algorithm upon said second algorithm being keyed by said selected channel key signal; and wherein the working key signal reproducing means in each descrambler reproduces said working key signal, when said selected channel key signal is reproduced in said descrambler, by processing said initialization vector signal in accordance with said second algorithm upon said second algorithm being keyed by said selected channel key signal that is reproduced in said descrambler.

6. A system according to claim 1, further comprising means for generating a subscriber key generation number that is common to all of the descramblers corresponding to said selected address group;

means for communicating said common subscriber key generation number to said subscribers' descramblers together with said group of unique encrypted category key signals;

means in each descrambler storing a subscriber address signal that is unique to said descrambler;

means in each descrambler for combining said stored unique subscriber address signal with said communicated common subscriber key generation number to provide a subscriber key generation signal that is unique to said descrambler;

means in each descrambler for providing said unique subscriber key signal by processing said unique subscriber key generation signal in accordance with a fourth encryption algorithm upon said fourth algorithm being keyed by a subscriber key seed signal that is unique to said descrambler; and means in each descrambler storing said subscriber key seed signal.

7. A system according to claim 6, further comprising means in each descrambler for retrieving said stored subscriber key seed signal to key said fourth algorithm in response to a predetermined seed address included in a given position in said communicated common subscriber key generation number.

8. A system according to claim 6, wherein in each descrambler, said unique subscriber address signal and said unique subscriber key seed signal are stored in a secure memory.

9. A system for selectively descrambling scrambled television signals that are communicated to a subscriber's descrambler in a subscription television system together with an initialization vector signal, and a group of unique encrypted category key signals, wherein said unique encrypted category key signals are individually addressed to different selected subscribers' descramblers, the system comprising means in the descrambler for providing a subscriber key signal that is unique to said descrambler means in the descrambler for reproducing a common category key signal, when said descrambler receives said unique encrypted category key signal addressed thereto, by processing said encrypted category key signal addressed to said descrambler in accordance with a first encryption algorithm upon said first algorithm being keyed by a unique subscriber key signal provided in said addressed descrambler;

means in the descrambler for reproducing a working key signal, when said common category key signal is reproduced in said descrambler, by processing said initialization vector signal in accordance with a second encryption algorithm upon said second algorithm being keyed by either said common category key signal that is reproduced in said descrambler or a key signal that is reproduced in said descrambler in relation to said reproduced common category key signal;

means in the descrambler for reproducing a unique keystream, when said working key signal is reproduced in said descrambler, by processing said initialization vector signal in accordance with a third encryption algorithm upon said third algorithm being keyed by said working key signal that is reproduced in said descrambler; and means in the descrambler for descrambling said scrambled television signal, when said unique keystream is reproduced in said descrambler, by descrambling said scrambled television signal in accordance with said unique keystream that is reproduced in said descrambler.

10. A system according to claim 9, wherein said first, second and third algorithms all include the "data encryption standard" (DES) algorithm.

11. A system according to claim 9, further comprising a secure memory in the descrambler storing information used for providing said unique subscriber key signal.

12. A system according to claim 9, wherein an encrypted channel key signal is communicated to said subscriber's descrambler together with said group of unique encrypted category key signals, the system further comprising means in the descrambler for reproducing a selected channel key signal, when said common category key signal is reproduced in said descrambler, by processing said encrypted channel key signal in accordance with a fourth encryption algorithm upon said fourth algorithm being keyed by said common category key signal that is reproduced in said descrambler;

wherein the working key signal reproducing means reproduces said working key signal, when said selected channel key signal is reproduced in said descrambler, by processing said initialization vector signal in accordance with said second encryption algorithm upon said second algorithm being keyed by said selected channel key signal that is reproduced in said descrambler.

13. A system according to claim 9, wherein a common subscriber key generation number is communicated to said subscribers' descramblers together with said group of unique encrypted category key signals, the system comprising means in each descrambler storing a subscriber address signal that is unique to said descrambler;

means in each descrambler for combining said stored unique subscriber address signal with said communicated common subscriber key generation number to provide a subscriber key generation signal that is unique to said descrambler;

means in the descrambler for providing said unique subscriber key signal by processing said unique subscriber key generation signal in accordance with a fourth encryption algorithm upon said fourth algorithm being keyed by a subscriber key seed signal that is unique to said descrambler; and means in the descrambler storing said subscriber key seed signal.

14. A system according to claim 13, further comprising means in the descrambler for retrieving said stored subscriber key seed signal to key said fourth algorithm in response to a predetermined seed address included in a given position in said communicated common subscriber key generation number.

15. A system according to claim 13, wherein said unique subscriber address signal and said unique subscriber key seed signal are stored in a secure memory.

16. A system for scrambling television signals that are transmitted to subscribers' descramblers in a subscription television system, comprising means storing a list of unique subscriber key signals for the descramblers of the system;

means storing a list defining a hierarchy of common category key signals corresponding to a hierarchy of address groups defined on the basis of subscribers having a common grade of service or other attributes that makes it desirable to address a group of subscribers' descramblers in common;

means for generating from said stored hierarchy list, a common category key signal corresponding to a selected address group in said hierarchy of address groups;

means for generating from said stored subscriber key signal list a group of unique subscriber key signals corresponding to said selected address group;

means in the scrambler for generating a group of unique encrypted category key signals individually addressed to different selected subscribers' descramblers by processing said generated common category key signal in accordance with a first encryption algorithm upon said first algorithm being keyed by said generated group of unique subscriber key signals;

means in the scrambler for generating a working key signal by processing an initialization vector signal in accordance with a second encryption algorithm upon said second algorithm being keyed by either said generated common category key signal or some other key signal;

means in the scrambler for generating a unique keystream by processing said initialization vector signal in accordance with a third encryption algorithm upon said third algorithm being keyed by said working key signal; and means for scrambling a television signal in accordance with said unique keystream to provide a scrambled television signal.

17. A system according to claim 16, wherein said first, second and third algorithms all include the "data encryption standard" (DES) algorithm.

18. A system according to claim 16, wherein the scrambling means comprises means for scrambling the video information portion of said television signal in response to one portion of each frame of said unique keystream; and means for encrypting the audio portion of said television signal in response to a different portion of each frame of said unique keystream.

19. A system according to claim 16, further comprising means for storing a list defining a plurality of channel key signals respectively corresponding to different time blocks for different television channels in the system;

means for generating a selected channel key signal from said channel key signal list;

means in the scrambler for generating an encrypted channel key signal by processing said selected channel key signal in accordance with a fourth encryption algorithm upon said fourth algorithm being keyed by said generated common category key signal;

wherein the working key signal generating means generates said working key signal by processing said initialization vector signal in accordance with said second algorithm upon said second algorithm being keyed by said selected channel key signal.

20. A communications system including a scrambler and a plurality of descramblers for respectively scrambling and selectively descrambling communications signals, comprising means in each descrambler for providing a descrambler key signal that is unique to said descrambler;

means storing a list of said unique descrambler key signals for the descramblers of the system;

means storing a list defining a hierarchy of common category key signals corresponding to a hierarchy of address groups defined on the basis of descramblers having a common grade of service or other attributes that makes it desirable to address a group of descramblers in common;

means for generating from said stored hierarchy list, a common category key signal corresponding to a selected address group in said hierarchy of address groups;

means for generating from said stored descrambler key signal list, a group of unique descrambler key signals corresponding to descramblers of said selected address group;

means in the scrambler for generating a group of unique encrypted category key signals individually addressed to different selected descramblers by processing said generated common category key signal in accordance with a first encryption algorithm upon said first algorithm being keyed by said generated group of unique descrambler key signals;

means in the scrambler for generating a unique keystream by processing an initialization vector signal in accordance with a second algorithm upon said second algorithm being keyed by either a said generated common category key signal or some other key signal;

means in the scrambler for scrambling a communications signal in accordance with said unique keystream to provide a scrambled communications signal;

means for communicating said scrambled communications signal, said initialization vector signal, and said group of unique encrypted category key signals to said descramblers;

means in each descrambler for reproducing said common category key signal, when said descrambler receives a said unique encrypted category key signal address thereto, by processing said encrypted category key signal addressed to said descrambler in accordance with said first algorithm upon said first algorithm being keyed by said unique descrambler key signal provided in said addressed descrambler;

means in each descrambler for reproducing said unique keystream, when said common category key signal is reproduced in said descrambler, by processing said initialization vector signal in accordance with said second algorithm upon said second algorithm being keyed by either said common category key signal that is reproduced in said descrambler or a key signal that is reproduced in said descrambler in relation to said reproduced common category key signal, consistent with which key signal was used to key the second algorithm in the scrambler; and means in each descrambler for descrambling said scrambled communications signal, when said unique encryption keystream is reproduced in said descrambler, by descrambling said scrambled communications signal in accordance with said unique keystream that is reproduced in said descrambler.

21. A communications system including a scrambler and a plurality of descramblers for respectively scrambling and selectively descrambling communications signals, comprising means in each descrambler for providing a descrambler key signal that is unique to said descrambler;

means for generating a common category key signal corresponding to a selected group of descramblers;

means for generating a group of unique descrambler key signals corresponding to said selected group of descramblers;

means for generating a descrambler key generation number that is common to all of the descramblers corresponding to said selected address group;

means in the scrambler for generating a group of unique encrypted category key signals individually addressed to different selected descramblers by processing said generated common category key signal in accordance with a first encryption algorithm upon said first algorithm being keyed by said generated group of unique descrambler key signals;

means in the scrambler for generating a unique keystream by processing an initialization vector signal in accordance with a second encryption algorithm upon said second algorithm being keyed by either a said generated common category key signal or some other key signal;

means in the scrambler for scrambling a communications signal in accordance with said unique keystream to provide a scrambled communications signal;

means for communicating said scrambled communications signal, said initialization vector signal, and said group of unique encrypted category key signals together with said common descrambler key generation number to said descramblers;

means in each descrambler for reproducing said common category key signal, when said descrambler receives a said unique encrypted category key signal addressed thereto, by processing said encrypted category key signal addressed to said descrambler in accordance with said first algorithm upon said first algorithm being keyed by said unique descrambler key signal provided in said addressed descrambler;

means in each descrambler for reproducing said unique keystream, when said common category key signal is reproduced in said descrambler, by processing said initialization vector signal in accordance with said second algorithm upon said second algorithm being keyed by either said common category key signal that is reproduced in said descrambler or a key signal that is reproduced in said descrambler in relation to said reproduced common category key signal, consistent with which key signal was used to key the second algorithm in the scrambler; and means in each descrambler for descrambling said scrambled communications signal, when said unique encryption keystream is reproduced in said descrambler, by descrambling said scrambled communications signal in accordance with said unique keystream that is reproduced in said descrambler;

wherein the means in each descrambler for providing the descrambler key signal that is unique to said descrambler comprises means in each descrambler storing a descrambler address signal this is unique to said descrambler;

means in each descrambler for combining said stored unique descrambler address signal with said communicated common descrambler key generation number to provide a descrambler key generation signal that is unique to said descrambler;

means in each descrambler for providing said unique descrambler key signal by processing said unique descrambler key generation signal in accordance with a third encryption algorithm upon said third algorithm being keyed by a descrambler key seed signal that is unique to said descrambler; and means in each descrambler storing said descrambler key seed signal.

22. A system according to claim 21, further comprising means in each descrambler for retrieving said stored descrambler key seed signal to key said third algorithm in response to a predetermined seed address included in a given position in said communicated common descrambler key generation number.

23. A system for selectively descrambling scambled communications signals that are communicated to a descrambler in a communications system together with an initialization vector signal, and a group of unique encrypted category key signals, wherein said unique encrypted category key signals are individually addressed to different selected descramblers, the system comprising means in the descrambler for providing a descrambler key signal that is unique to said descrambler means in the descrambler for reproducing a common category key signal, when said descrambler receives said unique encrypted category key signal addressed thereto, by processing said encrypted category key signal addressed to said descrambler in accordance with a first encryption algorithm upon said first algorithm being keyed by a unique descrambler key signal provided in said addressed descrambler;

means in the descrambler for reproducing a working key signal when said common category key signal is reproduced in said descrambler, by processing said initialization vector signal in accordance with a second encryption algorithm upon said second algorithm being keyed by either said common category key signal that is reproduced in said descrambler or a key signal that is reproduced in said descrambler in relation to said reproduced common category key signal;

means in the descrambler for reproducing a unique keystream, when said working key signal is reproduced in said descrambler, by processing said initialization vector signal in accordance with said third algorithm upon said third algorithm being keyed by said working key signal that is reproduced in said descrambler; and means in the descrambler for descrambling said scrambled communications signal, when said unique keystream is reproduced in said descrambler, by descrambling said scrambled communications signal in accordance with said unique keystream that is reproduced in said descrambler.

24. A system for selectively descrambling scrambled communications signals that are communicated to a descrambler in a communications system together with an initialization vector signal, a common descrambler key generation number, and a group of unique encrypted category key signals, wherein said unique encrypted category key signals are individually addressed to different selected descramblers, the system comprising means in each descrambler storing a descrambler address signal that is unique to said descrambler;

means in each descrambler for combining said stored unique descrambler address signal with said communicated common descrambler key generation number to provide a descrambler key generation signal that is unique to said descrambler;

means in the descrambler for providing said unique descrambler key signal by processing said unit decrambler key generation signal in accordance with a third encryption algorithm upon said third algorithm being keyed by a descrambler key seed signal that is unique to said descrambler;

means in the descrambler storing said descrambler key seed signal;

means in the descrambler for reproducing a common category key signal, when said descrambler receives said unique encrypted category key signal addressed thereto, by processing said encrypted category key signal addressed to said descrambler in accordance with a first encryption algorithm upon said first algorithm being keyed by a unique descrambler key signal provided in said addressed descrambler;

means in the descrambler for reproducing a unique keystream, when said common category key signal is reproduced in said descrambler, by processing said initialization vector signal in accordance with a second encryption algorithm upon said second algorithm being keyed by either said common category key signal that is reproduced in said descrambler or a key signal that is reproduced in said descrambler in relation to said reproduced common category key signal; and means in the descrambler for descrambling said scrambled communications signal, when said unique keystream is reproduced in said descrambler, by descrambling said scrambled communications signal in accordance with said unique keystream that is reproduced in said descrambler.

25. A system according to claim 24, further comprising means in the descrambler for retrieving said stored descrambler key seed signal to key said third algorithm in response to a predetermined seed address included in a given position in said communicated common descrambler key generation number.

26. A system for scrambling communications signals that are transmitted to descramblers in a communication system, comprising means for generating a common category key signal corresponding to a selected group of descramblers;

means for generating a group of unique descrambler key signals corresponding to said selected group of descramblers;

means in the scrambler for generating a group of unique encrypted category key signals individually addressed to different selected descramblers by processing said generated common category key signal in accordance with a first encryption algorithm upon said first algorithm being keyed by said generated group of unique descrambler key signals;

means in the scrambler for generating a working key signal by processing an initialization vector signal in accordance with a second encryption algorithm upon said second algorithm being keyed by either said generated common category key signal or some other key signal;

means in the scrambler for generating a unique keystream by processing said initialization vector signal in accordance with a third encryption algorithm upon said third algorithm being keyed by said working key signal; and means for scrambling a communications signal in accordance with said unique keystream to provide a scrambled communications signal.

* * * * *